US009657982B2

(12) United States Patent
Chou et al.

(10) Patent No.: US 9,657,982 B2
(45) Date of Patent: May 23, 2017

(54) TEMPERATURE-CONTROLLED MEDICINAL STORAGE DEVICES

(71) Applicant: Tokitae LLC, Bellevue, WA (US)

(72) Inventors: Fong-Li Chou, Bellevue, WA (US); Philip A. Eckhoff, Kirkland, WA (US); Lawrence Morgan Fowler, Kirkland, WA (US); Fridrik Larusson, Seattle, WA (US); Shieng Liu, Bellevue, WA (US); Nels R. Peterson, Bellevue, WA (US); Clarence T. Tegreene, Mercer Island, WA (US); Lowell L. Wood, Jr., Bellevue, WA (US)

(73) Assignee: Tokitae LLC, Bellevue, WA (US)

( * ) Notice: Subject to any disclaimer, the term of this patent is extended or adjusted under 35 U.S.C. 154(b) by 350 days.

(21) Appl. No.: 14/454,899

(22) Filed: Aug. 8, 2014

(65) Prior Publication Data

US 2015/0027157 A1    Jan. 29, 2015

Related U.S. Application Data

(63) Continuation-in-part of application No. 13/853,277, filed on Mar. 29, 2013, now Pat. No. 9,170,053.

(51) Int. Cl.
*F25D 23/12* (2006.01)
*F25D 17/04* (2006.01)
(Continued)

(52) U.S. Cl.
CPC .............. *F25D 17/042* (2013.01); *A61J 1/03* (2013.01); *B01D 53/26* (2013.01); *F25D 23/00* (2013.01);
(Continued)

(58) Field of Classification Search
CPC ..... F24F 5/0035; F24F 3/1423; Y02B 30/545; F25B 39/02; F25B 17/00
(Continued)

(56) References Cited

U.S. PATENT DOCUMENTS 4,007,601 A * 2/1977 Webbon ................. F25B 19/00
261/104
4,057,029 A 11/1977 Seiter
(Continued)

FOREIGN PATENT DOCUMENTS

WO    WO2013/001390 A1    1/2013

OTHER PUBLICATIONS

PCT International Search Report; International App. No. PCT/US2015/043808; Sep. 30, 2015; pp. 1-3.
(Continued)

*Primary Examiner* — Melvin Jones

(57) ABSTRACT

In some embodiments, a medicinal storage container includes: a desiccant unit including external walls forming a gas-impermeable barrier around an interior desiccant region and including an aperture; a heating element; a controller operably attached to the heating element; a cooling unit; a compressor system including at least one evaporator coil unit, the compressor operably connected to the controller; a vapor conduit, the vapor conduit attached to a the desiccant unit at a first end, the vapor conduit attached to the evaporative cooling unit at a second end, the vapor conduit forming an internal, gas-impermeable passageway between the desiccant unit and the cooling unit; a vapor control unit attached to the vapor conduit and operably attached to the controller; and a medicinal storage unit including external walls encircling a medicinal storage region including a temperature sensor operably connected to the controller.

43 Claims, 8 Drawing Sheets

(51) Int. Cl.
| | |
|---|---|
| *F25D 29/00* | (2006.01) |
| *B01D 53/26* | (2006.01) |
| *F25D 23/00* | (2006.01) |
| *A61J 1/03* | (2006.01) |

(52) U.S. Cl.
CPC ........... *F25D 29/00* (2013.01); *A61J 2200/40* (2013.01); *A61J 2200/42* (2013.01); *A61J 2200/44* (2013.01); *A61J 2200/50* (2013.01); *A61J 2200/72* (2013.01)

(58) Field of Classification Search
USPC ........ 62/94, 216, 218, 259.4, 269, 271, 480; 165/63
See application file for complete search history.

(56) References Cited

U.S. PATENT DOCUMENTS

| | | | |
|---|---|---|---|
| 4,205,531 A | 6/1980 | Brunberg et al. | |
| 4,924,676 A | 5/1990 | Maier-Laxhuber et al. | |
| 5,207,073 A | 5/1993 | Maier-Laxhuber et al. | |
| 5,359,861 A | 11/1994 | Maier-Laxhuber et al. | |
| 5,415,012 A | 5/1995 | Maier-Laxhuber et al. | |
| 5,440,896 A | 8/1995 | Maier-Laxhuber et al. | |
| 5,444,223 A | 8/1995 | Blama | |
| 5,518,069 A | 5/1996 | Maier-Laxhuber et al. | |
| 5,600,071 A | 2/1997 | Sooriakumar et al. | |
| 5,709,472 A | 1/1998 | Prusik et al. | |
| 5,740,680 A | 4/1998 | Lee | |
| 5,816,069 A * | 10/1998 | Ebbeson | F25B 17/08 62/235.1 |
| 5,900,554 A | 5/1999 | Baba et al. | |
| 6,042,264 A | 3/2000 | Prusik et al. | |
| 6,378,326 B2 | 4/2002 | Maier-Laxhuber et al. | |
| 6,389,839 B1 | 5/2002 | Sabin | |
| 6,438,992 B1 | 8/2002 | Smith et al. | |
| 6,584,797 B1 | 7/2003 | Smith et al. | |
| 6,688,132 B2 | 2/2004 | Smith et al. | |
| 6,701,724 B2 | 3/2004 | Smith et al. | |
| 6,820,441 B2 | 11/2004 | Maier-Laxhuber et al. | |
| 6,955,196 B2 * | 10/2005 | Giudici | F25D 23/062 141/65 |
| 7,213,403 B2 | 5/2007 | Maier-Laxhuber et al. | |
| 7,213,411 B2 * | 5/2007 | Maier-Laxhuber | F25B 17/08 62/269 |
| 7,240,507 B2 | 7/2007 | Jeuch | |
| 7,726,139 B2 | 6/2010 | Maier-Laxhuber | |
| 2003/0230092 A1 | 12/2003 | Lowenstein et al. | |

OTHER PUBLICATIONS

U.S. Appl. No. 13/853,277, Eckhoff et al.
3M Monitor Mark™; "Time Temperature Indicators—Providing a visual history of time temperature exposure"; 3M Microbiology; 2006; pp. 1-4; located at: http://multimedia.3m.com/mws/mediawebserver?mwsId=SSSSSufSevTsZxtUMx_9nxtBevUqevTSevTSevTSeSSSSSS--&fn=78-6901-2024-7.pdf.
BINE Informationsdienst; "Zeolite/water refrigerators, Projektinfo 16/10"; BINE Information Service; printed on Feb. 12, 2013; pp. 1-4; FIZ Karlsruhe, Germany; located at: http://www.bine.info/fileadmin/content/Publikationen/Englische_Infos/projekt_1610_engl_internetx.pdf.
Cole-Parmer; "Temperature Labels and Crayons"; printed on Sep. 27, 2007; p. 1; located at: www.coleparmer.com.
Conde-Petit, Manuel R.; "Aqueous solutions of lithium and calcium chlorides:—Property formulations for use in air conditioning equipment design"; 2009; pp. 1-27 plus two cover pages; M. Conde Engineering, Zurich, Switzerland.
Cool-System Keg GMBH; "Cool-System presents: CoolKeg® The world's first self-chilling Keg!"; printed on Feb. 6, 2013; pp. 1-5; located at: http://www.coolsystem.de/.
Dawoud, et al.; "Experimental study on the kinetics of water vapor sorption on selective water sorbents, silica gel and alumina under typical operating conditions of sorption heat pumps"; International Journal of Heat and Mass Transfer; 2003; pp. 273-281; vol. 46; Elsevier Science Ltd.
Dometic S.A.R.L.; "Introduction of Zeolite Technology into refrigeration systems, LIFE04 ENV/LU/000829, Layman's Report"; printed on Feb. 6, 2013; pp. 1-10; located at: http://ec.europa.eu/environment/life/project/Projects/index.cfm?fuseaction=home.showFile&rep=file&fil=LIFE04_ENV_LU_000829_LAYMAN.pdf.
Dow Chemical Company; "Calcium Chloride Handbook: A Guide to Properties, Forms, Storage and Handling"; Aug. 2003; pp. 1-28.
Gast Manufacturing, Inc.; "Vacuum and Pressure Systems Handbook"; printed on Jan. 3, 2013; pp. 1-20; located at: http://www.gastmfg.com/vphb/vphb_s1.pdf.
Gea Wiegand; "Pressure loss in vacuum lines with water vapour"; printed on Mar. 13, 2013; pp. 1-2; located at: http://produkte.gea-wiegand.de/GEA/GEACategory/139/index_en.html.
Hall, Larry D.; "Building Your Own Larry Hall Icyball"; printed on Mar. 27, 2013; pp. 1-4; located at: http://crosleyautoclub.com/IcyBall/HomeBuilt/HallPlans/IB_Directions.html.
Kozubal, et al.; "Desiccant Enhanced Evaporative Air-Conditioning (DEVap): Evaluation of a New Concept in Ultra Efficient Air Conditioning, Technical Report NREL/TP-5500-49722"; National Renewable Energy Laboratory; Jan. 2011; pp. i-vii, 1-60, plus three cover pages and Report Documentation Page.
machine-history.com; "Refrigeration Machines"; printed on Mar. 27, 2013; pp. 1-10; located at http://www.machine-history.com/Refrigeration%20Machines.
Marquardt, Niels; "Introduction to the Principles of Vacuum Physics"; 1999; pp. 1-24; located at: http://www.cientificosaficionados.com/libros/CERN/vaciol-CERN.pdf.
Modern Mechanix; "Icyball is Practical Refrigerator for Farm or Camp Use (Aug. 1930)"; bearing a date of Aug. 1930; printed on Mar. 27, 2013; pp. 1-3; located at: http://blog.modernmechanix.com/icyball-is-practical-refrigerator-for-farm-or-camp-use/.
Oxychem; "Calcium Chloride, A Guide to Physical Properties"; printed on Jan. 3, 2013; pp. 1-9, plus two cover pages and back page; Occidental Chemical Corporation; located at: http://www.cal-chlor.com/PDF/GUIDE-physical-properties.pdf.
Pilatowsky, I., Romero, R.J., Isaza, C.A., Gamboa, S.A., Sebastian, P.J., and Rivera, W.; "Chapter 5: Sorption Refrigeration Systems"; Cogeneration Fuel Cell-Sorption Air Conditioning Systems; Green Energy and Technology; 2011; pp. 75-102; Springer; ISBN 978-1 84996-027-4.
Restuccia, et al.; "Selective water sorbent for solid sorption chiller: experimental results and modeling"; International Journal of Refrigeration; 2004; pp. 284-293; vol. 27; Elsevier Ltd and IIR.
Rezk, et al.; "Physical and operating conditions effects on silica gel/water adsorption chiller performance"; Applied Energy; 2012; pp. 142-149; vol. 89; Elsevier Ltd.
Rietschle Thomas; "Calculating Pipe Size & Pressure Drops in Vacuum Systems, Section 9—Technical Reference"; printed on Jan. 3, 2013; pp. 9-5 through 9-7; located at: http://www.ejglobalinc.com/Tech.htm.
Saha, et al.; "A new generation of cooling device employing $CaCl_2$-in-silica gel-water system"; International Journal of Heat and Mass Transfer; 2009; pp. 516-524; vol. 52; Elsevier Ltd.
Shockwatch; "Environmental Indicators"; printed on Sep. 27, 2007; pp. 1-2; located at: www.shockwatch.com.
UOP; "An Introduction to Zeolite Molecular Sieves"; printed on Jan. 10, 2013; pp. 1-20; located at: http://www.eltrex.pl/pdf/karty/adsorbenty/ENG-Introduction%20to%20Zeolite%20Molecular%20Sieves.pdf.
Wang, et al.; "Study of a novel silica gel-water adsorption chiller. Part I. Design and performance prediction"; International Journal of Refrigeration; 2005; pp. 1073-1083; vol. 28; Elsevier Ltd and IIR.
Wikipedia; "Icyball"; Mar. 14, 2013; printed on Mar. 27, 2013; pp. 1-4; located at: http://en.wikipedia.org/wiki/Icyball.
Yong et al.; "Adsorption Refrigeration: A Survey of Novel Technologies"; Recent Patents on Engineering; 2007; pp. 1-21; vol. 1, No. 1; Bentham Science Publishers Ltd.

(56) References Cited

OTHER PUBLICATIONS

European Patent Office, Supplementary European Search Report, Pursuant to Rule 164 EPC; App. No. EP 14773074.1; Oct. 14, 2016 (received by our Agent on Nov. 4, 2014); pp. 1-8.

* cited by examiner

TEMPERATURE-CONTROLLED MEDICINAL STORAGE DEVICES

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority application(s)).

PRIORITY APPLICATIONS

The present application constitutes a continuation-in-part of U.S. patent application Ser. No. 13/853,277, entitled TEMPERATURE-CONTROLLED PORTABLE COOLING UNITS, naming Philip A. Eckhoff, Nels R. Peterson, Clarence T. Tegreene, and Lowell L. Wood, Jr. as inventors, filed 29 Mar. 2013, which is currently co-pending or is an application of which a currently co-pending application is entitled to the benefit of the filing date.

If the listings of applications provided above are inconsistent with the listings provided via an ADS, it is the intent of the Applicant to claim priority to each application that appears in the Domestic Benefit/National Stage Information section of the ADS and to each application that appears in the Priority applications section of this application.

All subject matter of the Priority applications and of any and all applications related to the Priority applications by priority claims (directly or indirectly), including any priority claims made and subject matter incorporated by reference therein as of the filing date of the instant application, is incorporated herein by reference to the extent such subject matter is not inconsistent herewith.

SUMMARY

In an aspect, a medicinal storage container includes, but is not limited to: a desiccant unit including one or more external walls, the one or more external walls sealed together to form a gas-impermeable barrier around an interior desiccant region, the one or more external walls including an aperture; a heating element positioned within the interior desiccant region; a controller operably attached to the heating element; a cooling unit including one or more external walls, the one or more external walls sealed together to form a gas-impermeable and liquid-impermeable barrier around an interior evaporative region, the one or more external walls including an aperture; a compressor system including at least one evaporator coil unit positioned within the interior evaporative region of the cooling unit, the compressor system operably connected to the controller; a vapor conduit including a first end and a second end, the vapor conduit attached to an external surface of the one or more external walls surrounding the aperture of the desiccant unit at the first end, the vapor conduit attached to an external surface of the one or more external walls surrounding the aperture of the evaporative cooling unit at the second end, the vapor conduit forming an internal, gas-impermeable passageway between the interior desiccant region of the desiccant unit and the interior evaporative region of the cooling unit; a vapor control unit attached to the vapor conduit, the vapor control unit operably attached to the controller; and a medicinal storage unit including one or more external walls encircling a medicinal storage region, the medicinal storage region including at least one temperature sensor operably connected to the controller.

In an aspect, a medicinal storage container includes, but is not limited to: a desiccant unit including one or more external walls, the one or more external walls sealed together to form a gas-impermeable barrier around an interior desiccant region, the one or more external walls including an aperture; a heating element positioned within the interior desiccant region; a controller operably attached to the heating element; a cooling unit including one or more external walls, the one or more external walls sealed together to form a gas-impermeable and liquid-impermeable barrier around an interior evaporative region, the one or more external walls including an aperture; a compressor system including at least one evaporator coil unit positioned within the interior evaporative region of the cooling unit, the compressor system operably connected to the controller; a freezer unit including one or more walls, the freezer unit in thermal contact with the at least one evaporator coil unit positioned within the interior evaporative region of the cooling unit; a vapor conduit including a first end and a second end, the vapor conduit attached to an external surface of the one or more external walls surrounding the aperture of the desiccant unit at the first end, the vapor conduit attached to an external surface of the one or more external walls surrounding the aperture of the evaporative cooling unit at the second end, the vapor conduit forming an internal, gas-impermeable passageway between the interior desiccant region of the desiccant unit and the interior evaporative region of the cooling unit; a vapor conduit attached to the vapor conduit, the vapor control unit operably attached to the controller; and a medicinal storage unit including one or more external walls encircling a medicinal storage region, the medicinal storage region including at least one temperature sensor operably connected to the controller.

In an aspect, a medicinal storage container includes, but is not limited to: a desiccant unit including one or more external walls, the one or more external walls sealed together to form a gas-impermeable barrier around an interior desiccant region, the one or more external walls including an aperture; a heating element positioned within the interior desiccant region; a controller operably attached to the heating element; a cooling unit including one or more external walls, the one or more external walls sealed together to form a gas-impermeable and liquid-impermeable barrier around an interior evaporative region, the one or more external walls including an aperture; a compressor system including at least one evaporator coil unit positioned within the interior evaporative region of the cooling unit, the compressor system operably connected to the controller; a vapor conduit including a first end and a second end, the vapor conduit attached to an external surface of the one or more external walls surrounding the aperture of the desiccant unit at the second end, the vapor conduit attached to an external surface of the one or more external walls surrounding the aperture of the evaporative cooling unit at the first end, the vapor conduit forming an internal, gas-impermeable passageway between the interior desiccant region of the desiccant unit and the interior evaporative region of the cooling unit; a vapor control unit attached to the vapor conduit, the vapor control unit operably attached to the controller; a thermal control unit attached to the vapor conduit, the thermal control unit operably attached to the controller; and a medicinal storage unit including one or more external walls encircling a medicinal storage region, the medicinal storage region including at least one temperature sensor operably connected to the controller.

In addition to the foregoing, other aspects are described in the claims, drawings, and text forming a part of the disclosure set forth herein. The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
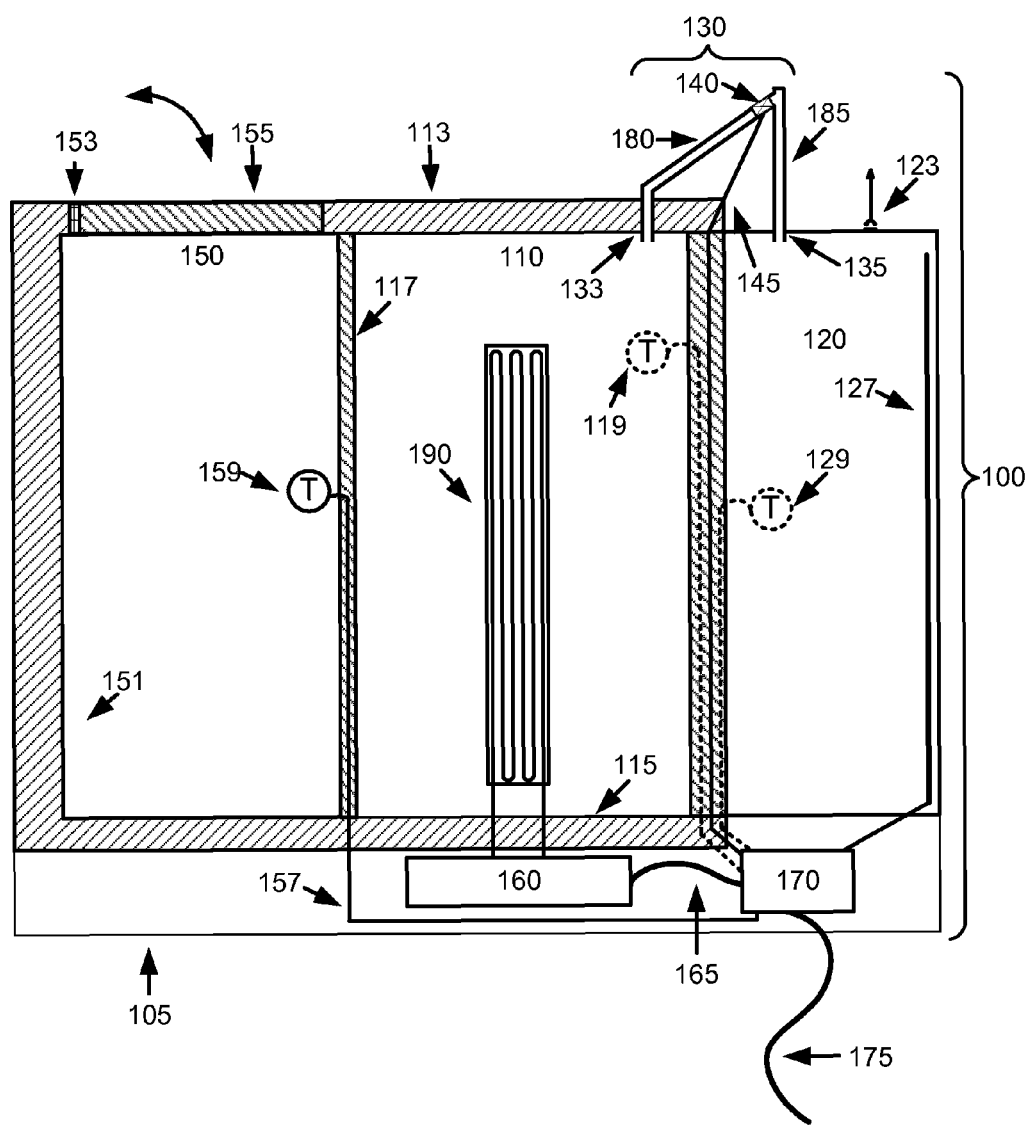
FIG. 1 is a schematic of a medicinal storage container.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The use of the same symbols in different drawings typically indicates similar or identical items unless context dictates otherwise.

Medicinal storage containers described herein include controlled evaporative cooling systems integrated with compressor-based cooling systems. The medicinal storage containers include evaporative cooling systems that are calibrated and controlled to maintain the interior storage regions of the containers within a predetermined temperature range over a period of time, measured in days or weeks, even in the absence of power to operate the compressor-based system. During use of the medicinal storage container, the temperature within the medicinal storage region is maintained within a temperature range for an extended period of time, such as weeks or months. The medicinal storage containers include compressor-based cooling of the liquid used in the evaporative cooling system as an adjunct system operating in series with the evaporative cooling system. In some embodiments, a medicinal storage container is calibrated to maintain the interior medicinal storage region of the container in a predetermined temperature range. In some embodiments, a medicinal storage container is calibrated to maintain the interior medicinal storage region of the container in a predetermined temperature range between 0 degrees Centigrade and 10 degrees Centigrade. In some embodiments, a medicinal storage container is calibrated to maintain the interior medicinal storage region of the container in a predetermined temperature range between 2 degrees Centigrade and 8 degrees Centigrade. Medicinal storage containers may be suitable, for example, for use in storage of medicinal agents such as vaccines, where the storage temperature must be held in a temperature range above 0 degrees Centigrade to prevent freezing of the stored material but also below a critical threshold, such as 10 degrees Centigrade, to maintain bioactivity of the medicinal agent. A medicinal storage container, as described herein, requires minimal power to operate and control the rate of evaporative cooling, such as a power requirement that is less than the power requirements of a standard refrigeration unit. A medicinal storage container can be recharged, repaired or refreshed to allow reuse of the storage container over a period of time.

Various embodiments are configured for use in different ambient conditions, including expected temperature variations. In some embodiments, medicinal storage containers are designed for use in environments wherein electrical power supply is intermittent or uncertain at least some of the time. For example, some medicinal storage containers are designed for use wherein electrical power is only available for an average of 2 hours per day, with some days having more power available and some days without power available. For example, some medicinal storage containers are designed for use wherein electrical power is only available for an average of 4 hours per day, with some days having more power available and some days without power available. For example, some medicinal storage containers are designed for use wherein electrical power is only available for an average of 6 hours per week, with some days having more power available and some days without power available. Some embodiments of a medicinal storage container do not require an external power source to be operational every day to maintain the internal temperature of the medicinal storage region within the preset temperature range. Some embodiments of a medicinal storage container do not require an external power source to be operational every week to maintain the internal temperature of the medicinal storage region within the preset temperature range. In some embodiments, a medicinal storage container is passive and does not require external power. In some embodiments, a medicinal storage container is manual and does not require external power (e.g. power is supplied by a hand crank or similar manual mechanism).

In some embodiments, medicinal storage containers are configured to maintain the medicinal storage region of the container within a temperature range between 0 degrees Centigrade and 10 degrees Centigrade for at least 7 days when the ambient temperature external to the medicinal storage container is approximately 43 degrees Centigrade continually, in the absence of electrical power. In some embodiments, medicinal storage containers are configured to maintain the medicinal storage region of the container within a temperature range between 0 degrees Centigrade and 10 degrees Centigrade for at least 7 days in the absence of electrical power when the ambient temperature external to the medicinal storage container fluctuates in a range between approximately 30 degrees Centigrade and approximately 43 degrees Centigrade, for example in a day/night cycle. In some embodiments, medicinal storage containers are configured to maintain the medicinal storage region of the container in the absence of electrical power within a temperature range between 0 degrees Centigrade and 10 degrees Centigrade for at least 14 days when the ambient temperature external to the medicinal storage container is approximately 43 degrees Centigrade continually. In some embodiments, medicinal storage containers are configured to maintain the medicinal storage region of the container in the absence of electrical power within a temperature range between 0 degrees Centigrade and 10 degrees Centigrade for at least 14 days when the ambient temperature external to the medicinal storage container fluctuates in a range between approximately 30 degrees Centigrade and approximately 43 degrees Centigrade, for example in a day/night cycle. In some embodiments, medicinal storage containers are configured to maintain the medicinal storage region of the container with power available no more than 2 hours per day for months or years within a temperature range between 0 degrees Centigrade and 10 degrees Centigrade indefinitely when the ambient temperature external to the medicinal storage container is approximately 43 degrees Centigrade continually. In some embodiments, medicinal storage containers are configured to maintain the medicinal storage region of the container within a temperature range between 0 degrees Centigrade and 10 degrees Centigrade with power available no more than 2 hours per day for months or years when the ambient temperature external to the medicinal storage container fluctuates in a range between approximately 30 degrees Centigrade and approximately 43 degrees Centigrade, for example in a day/night cycle.

Generally, a medicinal storage container is of a size, weight and shape for use within a medical clinic or health outpost, and configured for stable storage of medicinals, such as vaccines and thermo-labile medicinals, at the clinic or health outpost. A medicinal storage container such as those described herein can be movable. In some embodiments, a medicinal storage container is portable and can be carried by an individual person for an extended period of time, such as throughout a day of travel. In some embodiments, a medicinal storage container is movable but not necessarily configured to be easily portable by a single person. Some embodiments of medicinal storage containers, for example, range in mass between approximately 8 kilograms (Kg) and approximately 15 Kg. For example, in some embodiments a medicinal storage container is approximately 8 Kg in mass. For example, in some embodiments a medicinal storage container is approximately 9 Kg in mass. For example, in some embodiments a medicinal storage container is approximately 10 Kg in mass. For example, in some embodiments a medicinal storage container is approximately 11 Kg in mass. For example, in some embodiments a medicinal storage container is approximately 12 Kg in mass. For example, in some embodiments a medicinal storage container is approximately 13 Kg in mass. For example, in some embodiments a medicinal storage container is approximately 14 Kg in mass. For example, in some embodiments a medicinal storage container is approximately 15 Kg in mass. Some embodiments of medicinal storage containers, for example, range in mass between approximately 16 kilograms (Kg) and approximately 25 Kg. Some embodiments of medicinal storage containers, for example, range in mass between approximately 26 kilograms (Kg) and approximately 50 Kg.

In some embodiments, a medicinal storage container such as those described herein is the approximate size and shape of a standard top-opening refrigerator or freezer as used in a medical setting. For example, in some embodiments a medicinal storage container is approximately 1 meter square. For example, in some embodiments a medicinal storage container is approximately 1 meter or less in length on each side. In some embodiments, a medicinal storage container is approximately 10 liters in total internal volume. In some embodiments, a medicinal storage container is approximately 15 liters in total internal volume. In some embodiments, a medicinal storage container is approximately 20 liters in total internal volume. In some embodiments, a medicinal storage container is approximately 25 liters in total internal volume. In some embodiments, a medicinal storage container is approximately 30 liters in total internal volume. In some embodiments, a medicinal storage container is approximately 35 liters in total internal volume. In some embodiments, a medicinal storage container is approximately 40 liters in total internal volume. In some embodiments, a medicinal storage container is approximately 45 liters in total internal volume. In some embodiments, a medicinal storage container is approximately 50 liters in total internal volume. In some embodiments, a medicinal storage container is approximately 55 liters in total internal volume. In some embodiments, a medicinal storage container is approximately 60 liters in total internal volume. In some embodiments, a medicinal storage container is approximately 65 liters in total internal volume. In some embodiments, a medicinal storage container is approximately 70 liters in total internal volume. In some embodiments, a medicinal storage container is approximately 75 liters in total internal volume. In some embodiments, a medicinal storage container is approximately 80 liters in total internal volume. In some embodiments, a medicinal storage container is approximately 85 liters in total internal volume. In some embodiments, a medicinal storage container is approximately 90 liters in total internal volume. In some embodiments, a medicinal storage container is approximately 95 liters in total internal volume. In some embodiments, a medicinal storage container is approximately 100 liters in total internal volume.

In some embodiments, a medicinal storage container includes: a desiccant unit including one or more external walls, the one or more external walls sealed together to form a gas-impermeable barrier around an interior desiccant region, the one or more external walls including an aperture; a heating element positioned within the interior desiccant region; a controller operably attached to the heating element; a cooling unit including one or more external walls, the one or more external walls sealed together to form a gas-impermeable and liquid-impermeable barrier around an interior evaporative region, the one or more external walls including an aperture; a compressor system including at least one evaporator coil unit positioned within the interior evaporative region of the cooling unit, the compressor system operably connected to the controller; a vapor conduit including a first end and a second end, the vapor conduit attached to an external surface of the one or more external walls surrounding the aperture of the desiccant unit at the first end, the vapor conduit attached to an external surface of the one or more external walls surrounding the aperture of the evaporative cooling unit at the second end, the vapor conduit forming an internal, gas-impermeable passageway between the interior desiccant region of the desiccant unit and the interior evaporative region of the cooling unit; a vapor control unit attached to the vapor conduit, the vapor control unit operably attached to the controller; and a medicinal storage unit including one or more external walls encircling a medicinal storage region, the medicinal storage region including at least one temperature sensor operably connected to the controller.

Items represented in the Figures herein are not necessarily drawn to scale for purposes of illustration.

FIG. 1 illustrates aspects of a medicinal storage container 100. The schematic of FIG. 1 is depicted as a side view in substantial cross-section in order to illustrate internal features of the medicinal storage container 100. The medicinal storage container 100 depicted includes a medicinal storage unit on the far left side in the view of FIG. 1. The medicinal storage unit includes external walls 151 encircling a medicinal storage region 150. In some embodiments, the medicinal storage unit includes one or more walls adjacent to the medicinal storage region, the one or more walls fabricated to be thermally-conductive at expected temperatures of the medicinal storage region. In some embodiments, the external walls are fabricated from a thermally-conductive material, such as aluminum or copper. In some embodiments, the external walls are fabricated from a rigid plastic material. The external walls 151 can include an access aperture.

The medicinal storage unit includes at least one temperature sensor which is operably connected to the controller of the medicinal storage container. The temperature sensor can be, for example, positioned and configured to detect the temperature of the space within the medicinal storage unit which is intended for use with one or more medicinal products, such as vaccines or biologicals. For example, as illustrated in FIG. 1, in some embodiments the medicinal storage unit includes at least one temperature sensor 159 which is connected to the controller 170 with a wire connector 157. The temperature sensor can include, for example, an electronic temperature sensor. The temperature sensor can include, for example, a chemical temperature sensor. The temperature sensor can include, for example, a mechanical temperature sensor. The temperature sensor can include, for example, a bimetallic-based temperature sensor. The temperature sensor can include, for example, a thermocouple. The temperature sensor can include, for example, a low-energy temperature sensor, such as a Thermodo device (Robocat, Copenhagen, Denmark). Some embodiments include wherein at least one temperature sensor of the medicinal storage unit is positioned and configured to detect temperature within the space occupying the medicinal storage region. Some embodiments include wherein at least one temperature sensor of the medicinal storage unit is positioned and configured to detect temperature of an external wall of the medicinal storage region. In some embodiments, at least one temperature sensor is affixed within the medicinal storage region. In some embodiments, at least one temperature sensor is affixed to an external wall of the medicinal storage region, for example at a position where heat is expected to conduct through the external wall. In some embodiments, at least one temperature sensor is affixed to a recess or indentation in the external wall of the medicinal storage region, the recess or indentation positioned into the interior space of the medicinal storage region.

In some embodiments, the medicinal storage unit of a medicinal storage container includes a lid reversibly mated to an access aperture in the external walls. In some embodiments, the medicinal storage unit of a medicinal storage container includes a hinged lid positioned in the external walls adjacent to a top region of the medicinal storage region, the hinged lid configured to allow access to the medicinal storage region by a user. For example, in the view shown in FIG. 1, the medicinal storage unit includes a reversibly affixed lid 155 attached to the medicinal storage container 100 with a hinge 153. As shown in the embodiment illustrated in FIG. 1, the hinged lid can be configured to be opened upward by a user. FIG. 1 depicts the direction of opening and closing of the lid 155 with a bi-directional arrow. In some embodiments, the medicinal storage unit of a medicinal storage container includes internal shelves or racks configured to hold one or more medicinal agents during storage. For example, a medicinal storage unit of a medicinal storage container can include one or more racks of a size and shape to hold the secondary packaging of one or more injectable vaccines in storage prior to use by a medical professional, such as a vaccinator. The shelves or racks can be affixed to the external walls of the medicinal storage unit. The shelves or racks can be positioned relative to access through a reversibly affixed lid. Some embodiments include additional inventory or tracking components, such as a bar code scanner or RFID tag reader. Some embodiments include a light, such as an LED, positioned to illuminate the interior of the medicinal storage unit.

In some embodiments, the total internal volume of a medicinal storage unit of a medicinal storage container can range from approximately 1 liter (L) to approximately 5.0 L. In some embodiments, the total internal volume of a medicinal storage unit of a medicinal storage container can range from approximately 5 L to approximately 10.0 L. In some embodiments, the total internal volume of a medicinal storage unit of a medicinal storage container can range from approximately 1.5 L to approximately 4.0 L. For example, in some embodiments the total internal volume of a medicinal storage unit is approximately 1.5 L. For example, in some embodiments the total internal volume of a medicinal storage unit is approximately 2.0 L. For example, in some embodiments the total internal volume of a medicinal storage unit is approximately 2.5 L. For example, in some embodiments the total internal volume of a medicinal storage unit is approximately 3.0 L. For example, in some embodiments the total internal volume of a medicinal storage unit is approximately 3.5 L. For example, in some embodiments the total internal volume of a medicinal storage unit is approximately 4.0 L. For example, in some embodiments the total internal volume of a medicinal storage unit is approximately 5.0 L. For example, in some embodiments the total internal volume of a medicinal storage unit is approximately 7.5 L. For example, in some embodiments the total internal volume of a medicinal storage unit is approximately 10.0 L.

In the embodiment illustrated in FIG. 1, the medicinal storage container 100 includes a cooling unit positioned between the medicinal storage unit and the desiccant unit. In the illustrated embodiment, the cooling unit includes a first side wall positioned proximal to the medicinal storage unit, and a second side wall positioned proximal to the desiccant unit. In the embodiment shown in FIG. 1, the cooling unit is positioned in the approximate center of the medicinal storage container 100. Some embodiments include a plurality of cooling units. For example, some embodiments include two cooling units positioned adjacent to opposing side walls of a single medicinal storage unit of a medicinal storage container. For example, some embodiments include four cooling units, each of which are positioned adjacent to one of four side walls of a substantially rectangular medicinal storage unit of a medicinal storage container. For example, some embodiments include two cooling units, each positioned adjacent to a different medicinal storage unit of a medicinal storage container.

In some embodiments, a cooling unit of a medicinal storage container includes: an upper region, the upper region positioned adjacent to the aperture in the exterior wall; a lower region, the lower region positioned below the upper region; and an evaporative liquid positioned substantially within the lower region. In some embodiments, a cooling unit of a medicinal storage container includes at least one evaporative liquid within the interior evaporative region of the evaporative cooling unit. An "evaporative liquid," as used herein, is a liquid with evaporative properties under the expected temperatures and gas pressures of the interior region of an evaporative unit during use of a medicinal storage container. For example, in some embodiments the interior evaporative region of an evaporative unit includes a partial gas pressure of approximately 5% of atmospheric pressure external to the medicinal storage container, and the evaporative liquid within the interior evaporative region includes water. For example, in some embodiments the interior evaporative region of an evaporative unit includes a partial gas pressure of approximately 10% of atmospheric pressure external to the medicinal storage container, and the evaporative liquid within the interior evaporative region includes methanol. For example, in some embodiments the interior evaporative region of an evaporative unit includes a partial gas pressure of approximately 15% of atmospheric pressure external to the medicinal storage container, and the evaporative liquid within the interior evaporative region includes ammonia. For example, in some embodiments the evaporative liquid can include additional agents to promote or reduce the evaporative potential of the evaporative liquid. The volume of an evaporative liquid used in an embodiment can depend on factors including the type of evaporative liquid, the temperature range of the medicinal storage region during use of the container, the expected temperature of the evaporator coil unit, the type, position and amount of insulation used in the container, the type of desiccant used, the expected external power available during use of the container, and the expected ambient temperature during use of the container. In some embodiments, the total volume of the evaporative liquid used can be approximately 90% of the total volume of the interior evaporative region of an evaporative unit. In some embodiments, the total volume of the evaporative liquid used can be approximately 85% of the total volume of the interior evaporative region of an evaporative unit. In some embodiments, the total volume of the evaporative liquid used can be approximately 80% of the total volume of the interior evaporative region of an evaporative unit.

In some embodiments, a cooling unit of a medicinal storage container is positioned adjacent to two or more sides of a medicinal storage region. For example, in some embodiments a cooling unit of a medicinal storage container is configured to be positioned adjacent to two sides of a medicinal storage region. For example, in some embodiments a cooling unit of a medicinal storage container is configured to be positioned adjacent to three sides of a medicinal storage region. For example, in some embodiments a cooling unit of a medicinal storage container is configured to be positioned adjacent to four sides of a medicinal storage region. In some embodiments, a medicinal storage region includes one or more walls configured with a substantially rounded exterior, with a cooling unit of a medicinal storage container including an external surface positioned and configured to reversibly mater with the substantially rounded exterior.

In some embodiments, a cooling unit of a medicinal storage container includes a liquid retaining unit connected to at least one surface adjacent to the interior evaporative region. In some embodiments, a liquid retaining unit is connected to the interior surface of the interior evaporative region of the cooling unit. In some embodiments, a liquid retaining unit is connected to at least one surface adjacent to the interior evaporative region of the cooling unit. A liquid retaining unit can be configured to minimize the movement of small quantities, such as drops, of evaporative liquid within the interior evaporative region and into the vapor conduit during transport or movement of the medicinal storage container. For example, the liquid retaining unit can include a mesh or screen with apertures of a suitable size to substantially inhibit drops of a liquid from passing through. The liquid retaining unit should permit free flow of gas and liquid vapor through the liquid retaining unit, while inhibiting larger quantities of the liquid, such as drops or droplets.

In the embodiment illustrated in FIG. 1, the medicinal storage container 100 includes a cooling unit including one or more external walls 115, the one or more external walls sealed together to form a gas-impermeable and liquid-impermeable barrier around an interior evaporative region 110, the one or more external walls 115 including an aperture 133. In the embodiment shown in FIG. 1, the aperture 133 is positioned within the top side of the cooling unit external walls 115. The aperture 133 is affixed to a first end 180 of vapor conduit 130 with a liquid- and vapor-tight seal.

As shown in FIG. 1, the vapor conduit 130 of the medicinal storage container 100 has a first end 180 and a second end 185, each of the ends of the vapor conduit 130 respectively attached to the evaporative unit 110 and the desiccant unit 120 at a site adjacent to the top edge of each of the evaporative unit 110 and the desiccant unit 120. As used herein, a "conduit" refers to a structure with a hollow interior and at least two apertures at distal ends, such as a pipe, a tube or a duct. In some embodiments, the interior hollow of a conduit has a substantially round cross-section. In some embodiments, the interior hollow of a conduit has a cross-section that is substantially rectangular, elliptical, or irregularly shaped. In some embodiments, the exterior of the conduit appears boxlike or rectangular, while a continuous space within forms a partially hollow interior. A "vapor conduit," as used herein, refers to a conduit configured for gas, including evaporative liquid in a vapor form, to move through the conduit. In some embodiments, the vapor conduit 130, the evaporative unit 110 and the desiccant unit 120 are fabricated from individual components and then joined together with gas-impermeable seals. In some embodiments, the vapor conduit 130, the evaporative unit 110 and the desiccant unit 120 are substantially fabricated as a single unit, such as fabricated with blow-molded plastic or metal. For example, one or more of the components can be fabricated from a polycarbonate plastic. For example, one or more of the components can be fabricated from aluminum or stainless steel. Although the vapor control unit 140 is visible in the embodiment illustrated in FIG. 1, in some embodiments the vapor control unit 140 is entirely internal to the vapor conduit 130 and not externally visible to the medicinal storage container 100.

A vapor control unit is positioned at the junction between a first end of a vapor conduit and a second end of a vapor conduit. Some embodiments include a vapor control unit within the interior dimensions of the vapor conduit. In some embodiments, a vapor control unit is entirely internal to the vapor conduit. In some embodiments, a vapor control unit includes one or more components that are external to the vapor conduit. The vapor control unit includes a valve region and a control region. The control region is connected to the controller, for example with a wire connector. A vapor control unit is positioned and configured to reversibly inhibit the passage of vapor through the vapor conduit. A vapor control unit can be configured to reversibly inhibit the passage of vapor through the vapor conduit in response to signals received from the controller.

In some embodiments, a vapor control unit includes at least one valve configured to control movement of gas through the internal passageway of the vapor conduit between the interior desiccant region of the desiccant unit and the interior evaporative region of the cooling unit, the at least one valve configured to operate in response to signals received from the controller. A vapor control unit can include a valve that is a mechanical valve, such as a butterfly valve. A vapor control unit can be mechanically operated. A vapor control unit can include a motor configured to operate the valve. In some embodiments, the valve is a butterfly valve directly physically connected to the control region of the vapor control unit. The vapor control unit operates in response to signals sent by the controller, such as through a wire connector connected between the vapor control unit and the controller. The valve is positioned and sized to include at least two positions, a substantially open position and a substantially closed position within the valve region. When the valve is in a substantially open position, the dimensions of the valve within the valve region of the vapor control unit permit free flow of gas, including vapor, between the first end of the vapor conduit and the second end of the vapor conduit to equalize gas pressure between the first end of the vapor conduit and the second end of the vapor conduit. The valve is of a size and shape to substantially block the flow of gas between first end of the vapor conduit and the second end of the vapor conduit when the valve is in a substantially closed position. In some embodiments, the valve of a vapor control unit is directly connected to a motor. For example, in some embodiments the motor is a servo-motor. For example, in some embodiments the motor is a stepper motor. The motor is directly connected to the valve and causes the opening and closing of the valve on receipt of signals from the controller. The motor can be directly connected to the controller with a wire connector. In some embodiments, a valve includes one or more intermediate positions that partially impede gas flow through the valve between the first end of the vapor conduit and the second end of the vapor conduit, but do not fully block gas flow. For example, a valve can have a "half-flow" position, or a position that reduces the flow of gas through the valve, and therefore between the first end of the vapor conduit and the second end of the vapor conduit, by approximately half, relative to the fully open position. For example, a valve can have a "quarter-flow" position, or a position that reduces the flow of gas through the valve, and therefore between the first end of the vapor conduit and the second end of the vapor conduit, to approximately one quarter of the gas flow relative to the fully open position.

In some embodiments a medicinal storage container includes an optional transmitter unit. For example, the control region of a vapor control unit can include a transmitter unit including an antenna and circuitry configured to send a signal from the antenna. The circuitry configured to send a signal from the antenna can be responsive to the controller, for example the circuitry configured to send a signal from the antenna can send the signal based on data received from the controller (e.g. one or more data points based on data from the sensor, information on activity of the motor, or the result of calculations made by the controller). In some embodiments, a controller can include a transmitter unit. The transmitter unit can be, for example, a Bluetooth™ unit. The transmitter unit can be, for example, an IR transmitter.

In some embodiments, a vapor control unit includes a valve region including a valve and a movable unit. The movable unit is physically attached to the valve and configured to provide physical force against the valve in response to a stimulus. For example, in some embodiments a movable unit is a crank mechanism attached to a valve. For example, in some embodiments a movable unit includes a bonnet and a stem attached to a valve interior that includes a disc and a physical seat for the disc. For example, in some embodiments a valve includes a physically deformable region of a conduit, and a movable unit includes at least two physical elements that are positioned to press against opposing exterior surfaces of the physically deformable region of the conduit in response to a signal from the controller. For example, in some embodiments a valve region includes a valve with a physically deformable region of a conduit and a movable unit that includes a reversible clamp on the exterior of the valve, wherein the movable unit is operably attached to the controller. In some embodiments, the movable unit includes a motor. In some embodiments, the movable unit is entirely internal to the vapor control unit. In some embodiments, the movable unit includes one or more elements that are external to the vapor control unit. In some embodiments, the movable unit includes one or more elements that are passively operated, such as a bimetallic element that changes configuration in response to temperature.

In some embodiments, a medicinal storage container includes one or more segments of insulation surrounding the cooling unit and the medicinal storage unit. For example, FIG. 1 depicts a medicinal storage container 100 with insulation 113 surrounding the cooling unit and the medicinal storage unit. The insulation can include, for example, foam insulation. The insulation can include, for example, one or more vacuum-insulated panels (VIP panels). The insulation can include, for example, one or more panels including internal layers of multilayer-insulation (MLI) surrounded by evacuated space. The insulation can include, for example, a fiberglass-based insulation material. The insulation can include, for example, a ceramic insulation material. The type(s) and amount of insulation can be selected based on factors including the expected temperature range of the medicinal storage region, the expected ambient temperature range for the container, and the amount of external power utilized by the container.

A medicinal storage container includes at least one evaporator coil unit. In some embodiments, at least one evaporator coil unit is positioned adjacent to an external wall of the container. In some embodiments, at least one evaporator coil unit is positioned within the container in a region adjacent to the evacuated space of the interior evaporative region within the cooling unit. In some embodiments, at least one evaporator coil unit is positioned within the interior evaporative region of the cooling unit. For example, in the embodiment illustrated in FIG. 1, an evaporator coil unit is positioned substantially centrally within the interior evaporative region 110 of the cooling unit. In some embodiments, at least one evaporator coil unit is positioned adjacent to the exterior wall of the cooling unit that is proximal to the desiccant unit. In some embodiments, at least one evaporator coil unit that is positioned within the interior evaporative region of the cooling unit is positioned substantially in the center of the cooling unit. In some embodiments, at least one evaporator coil unit positioned within the interior evaporative region of the cooling unit is positioned adjacent to the exterior wall of the cooling unit that is proximal to the medicinal storage unit.

In some embodiments, the cooling unit includes one or more thermal conduction elements affixed to the at least one evaporator coil unit. For example, one or more thermal conduction elements can be positioned within the interior evaporative region. For example, the cooling unit can include one or more thermal fins and/or thermal flanges affixed to an evaporator coil unit positioned within the interior evaporative region, the one or more thermal fins and/or thermal flanges positioned and configured to transfer thermal energy between the interior of the cooling unit and the evaporator coil unit. For example, the cooling unit can include one or more thermal fins and/or thermal flanges affixed to an evaporator coil unit positioned within the interior evaporative region, the one or more thermal fins and/or thermal flanges positioned and configured to transfer thermal energy between a liquid held in the interior of the cooling unit and the evaporator coil unit. A thermal conduction element can be fabricated from a thermally-conductive metal, for example aluminum or copper.

FIG. 1 also depicts that the medicinal storage container 100 embodiment illustrated includes a compressor system 160 including at least one evaporator coil unit 190 positioned within the interior evaporative region 110 of the cooling unit, the compressor system 160 operably connected to the controller 170. In the embodiment illustrated in FIG. 1, an evaporator coil unit 190 is positioned substantially in the center of the interior evaporative region 110. In some embodiments, an evaporator coil unit is positioned substantially externally to the interior evaporative region. Although the interior evaporative region 110 is sealed to be gas-impermeable and liquid-impermeable, the evaporator coil unit 190 positioned within the interior evaporative region 110 of the cooling unit is connected to the remainder of the compressor system 160 with wires traversing the lower wall 115 of the cooling unit. The compressor system is operably connected to the controller. For example, in the embodiment illustrated in FIG. 1 the compressor system 160 is operably connected to the controller 170 with a wire connector 165. Although the embodiment illustrated in FIG. 1 shows the compressor system 160 is operably connected to the controller 170 with a wire connector 165 traversing the lower wall 115 of the interior evaporative region 110, some embodiments include one or more wires traversing a side or top wall. The traversing wires can include seals adjacent to the walls to create a gas-tight and liquid-tight seal around the interior evaporative region.

In some embodiments, the compressor system includes a single-stage vapor compression system. In some embodiments, the compressor system includes an evaporator coil unit positioned within the interior evaporative region, the evaporator coil unit connected to a compressor, a condenser, and an expansion valve in a closed-loop system, with the compressor, the condenser, and the expansion valve positioned in an adjacent region of the medicinal storage container, external to the interior evaporative region. In some embodiments, parts of the compressor system positioned in an adjacent region of the medicinal storage container, external to the interior evaporative region are within a base of the medicinal storage container. In some embodiments, a compressor system includes: at least one evaporator coil unit positioned within the interior evaporative region of the cooling unit; a compressor unit; a condenser unit; and metering device, wherein the compressor unit, the condenser unit, and the metering device are positioned exterior to the interior evaporative region of the cooling unit. The metering device can include, for example, an expansion valve. The metering device can include, for example, a capillary tube metering device.

FIG. 1 illustrates an embodiment wherein the evaporator coil unit 190 is positioned within the interior evaporative region 110 of the cooling unit, with refrigerant tubes traversing the lower wall of the interior evaporative region 110 of the cooling unit to connect the evaporator coil unit 190 to the remainder of the compressor system 160 positioned adjacent to the cooling unit. The location(s) where the refrigerant tubes traverse the wall of the interior evaporative region of the cooling unit are sealed with vapor- and liquid-impermeable seals, in order to maintain the evaporative liquid within the interior evaporative region of the cooling unit. In some embodiments, a compressor system includes a switch configured to turn the compressor system on and off in response to a signal received from the controller.

In some embodiments, a cooling unit includes one or more temperature sensors within the interior evaporative region, the one or more temperature sensors operably attached to the controller. The one or more temperature sensors can be attached to a controller, for example, with a wire connector. FIG. 1 illustrates a temperature sensor 119 positioned within the interior evaporative region 110 of the cooling unit, the temperature sensor 119 attached to the controller 170 with a wire connector. The one or more temperature sensors can include, for example, an electronic temperature sensor. The one or more temperature sensors can include, for example, a chemical temperature sensor. The one or more temperature sensors can include, for example, a mechanical temperature sensor. The one or more temperature sensors can include, for example, a bimetallic-based temperature sensor. The one or more temperature sensors can include, for example, a thermocouple. The one or more temperature sensors can include, for example, a low-energy temperature sensor, such as a Thermodo device (Robocat, Copenhagen, Denmark). One or more temperature sensors within the interior evaporative region can be positioned and configured to detect the temperature of an evaporative liquid at a position within the interior evaporative region. One or more temperature sensors within the interior evaporative region can be positioned and configured to detect the temperature of the space at a position within the interior evaporative region, for example above the liquid level of the evaporative liquid. One or more temperature sensors within the interior evaporative region can be configured to send signals regarding the detected temperature on a regular basis, for example every second, every 5 seconds, or every 10 seconds. One or more temperature sensors within the interior evaporative region can be configured to send signals regarding the detected temperature in response to receipt of a query signal from the controller.

A medicinal storage container includes a controller positioned and configured to regulate function of other components of the medicinal storage container. The controller can include an electronic controller. For example, in some embodiments, an electronic controller is a "bang-bang" controller. For example, in some embodiments, an electronic controller is a bounded system controller. For example, in some embodiments, an electronic controller is a threshold system controller. For example, in some embodiments an electronic controller is a feedback system controller. For example, in some embodiments an electronic controller is a PID controller. The controller can include memory, for example electronic memory. In some embodiments, the controller can include a look-up table, for example a look-up table including ranges of acceptable parameters, such as temperature and pressure, for units within the container. In some embodiments, the controller can include calculation parameters, such as the expected heat leak of the medicinal storage region for a particular embodiment relative to the external temperature of the container. A controller is operably attached to the compressor system. In the embodiment illustrated in FIG. 1, the medicinal storage container 100 includes a controller 170. In the illustrated embodiment, the controller 170 is connected to the compressor system 160 with a wire connector 165. In some embodiments, a controller is connected to the compressor system with a wireless connector. The controller is connected to a power source. In some embodiments, the controller is connected to an electrical power source. For example, in some embodiments a controller is connected to a municipal power supply, an electric generator, a solar panel, or other electrical power source. In the embodiment illustrated in FIG. 1, the controller 170 is attached to a wire connector 175 that can be connected to a municipal power supply, for example via a wall socket.

The controller can include circuitry configured to perform specific operations and processes. For example, the controller can include circuitry configured to accept data from an attached sensor and determine if the data is within a preset range, wherein the controller sends a signal to the motor resulting in either opening or closing the valve of the vapor control unit, relative to if the data is above or below the preset range. For example, in some embodiments a controller includes circuitry that accepts data originating with a temperature sensor, compares that data with a preset range of temperatures, and if the data from the temperature sensor indicates a detected temperature that is above the preset range, the controller sends a signal to the motor to initiate the valve to open. For example, in some embodiments a controller includes circuitry that accepts data originating with a temperature sensor, compares that data with a preset range of temperatures, and if the data from the temperature sensor indicates a detected temperature that is within the preset range, the controller does not send a signal to the motor. For example, in some embodiments a controller includes circuitry that accepts data originating with a temperature sensor, compares that data with a preset range of temperatures, and if the data from the temperature sensor indicates a detected temperature that is below the preset range, the controller sends a signal to the motor to initiate the valve to close. In some embodiments, the preset temperature range for data from a temperature sensor within the medicinal storage region is between 2 degrees Centigrade and 8 degrees Centigrade. In some embodiments, the preset temperature range is between 3 degrees Centigrade and 7 degrees Centigrade. In some embodiments, the preset temperature range is between −2 degrees Centigrade and +2 degrees Centigrade. In some embodiments, the preset temperature range is between −3 degrees Centigrade and −7 degrees Centigrade.

In some embodiments, the controller includes circuitry that calculates an error value between data accepted from a sensor and a predetermined target value. The calculation can include data accepted over time, i.e. multiple data points from a single sensor. The calculation can include data accepted from a plurality of sensors. In response to the calculated error values, the controller can calculate a predicted future error value. The circuitry then calculates a combined error value. If the calculated combination of the calculated past, present and future error values is beyond the preset setpoint, the circuitry then initiates a signal to the motor to alter the opening of the valve. For example, a preset setpoint for some embodiments of a vapor control unit is 5 degrees Centigrade. In such an embodiment, if the combination of the calculated past, present and future error values was higher than the preset setpoint (e.g. 8 degrees Centigrade), the controller would send a signal to the motor, the signal of a type to initiate the motor to open the attached valve. Similarly, in such an embodiment, if the combination of the calculated past, present and future error values was lower than the preset setpoint (e.g. 2 degrees Centigrade), the controller would send a signal to the motor, the signal of a type to initiate the motor to close the attached valve.

In some embodiments, a controller is operably connected to one or more temperature sensors, the vapor control unit, and the heating element within the interior desiccant region. The controller is configured to receive signals from the components, for example the temperature sensors, and to send signals to components. For example, in response to a signal indicating elevated temperature in the medicinal storage region, a controller may send a signal to the vapor control unit, the signal of a type that will cause the vapor control unit to open a valve in the conduit to increase evaporative cooling in the evaporative cooling region and, correspondingly, decrease the temperature in the medicinal storage region. In the embodiment shown in FIG. 1, the controller 170 is operably connected to the temperature sensor 159 positioned within the medicinal storage region 150 with a wire connector 157. The controller 170 is also operably connected to the vapor control unit 140 with a wire connector 145. Similarly, the controller 170 is operably connected to the heating element 127 within the desiccant region 120 with a wire connector. In some embodiments, a controller includes: circuitry configured to control operation of the heating element in response to signals received from the at least one temperature sensor within the medicinal storage region. In some embodiments, a controller is operably attached to the heating element and to the at least one temperature sensor with a wire connector.

In some embodiments, the medicinal storage container includes thermal insulation surrounding the medicinal storage unit and the cooling unit. For example, in the embodiment shown in FIG. 1, the medicinal storage container 100 includes thermal insulation 113 surrounding the outward-facing external walls 151 of the medicinal storage unit and the outward-facing external walls 115 of the cooling unit. This thermal insulation can also be positioned against the outward-facing external wall of the cooling unit proximal to the desiccant unit. Some embodiments also include thermal insulation positioned between the exterior surfaces of facing external walls between the medicinal storage unit, the cooling unit and the desiccant unit of a medicinal storage container. For example, in the embodiment shown in FIG. 1, thermal insulation 117 is positioned between the opposing surfaces of the external walls 151 of the medicinal storage unit and the external walls 115 of the cooling unit. In some embodiments, the thermal insulation includes a plastic-based foam material. In some embodiments, the thermal insulation includes one or more vacuum insulation panels (VIP panels). In some embodiments, the exterior of the desiccant unit does not include additional insulation, in order to permit heat to diffuse from that region of the container, for example during absorption.

In some embodiments, there are one or more thermal transfer units positioned within the thermal insulation positioned between the opposing surfaces of the external wall of the medicinal storage unit adjacent to the external wall of the cooling unit. For example, a thermal transfer unit can include one or more thermosyphons, one or more heat pipes, or one or more vapor chambers positioned and configured to encourage the transfer of heat from the interior of the medicinal storage container into the interior of the cooling unit. In some embodiments, for example, a heat pipe can be positioned within the thermal insulation positioned between the opposing surfaces of the external wall of the medicinal storage unit adjacent to the external wall of the cooling unit and configured to transfer heat from the interior of the medicinal storage container into the interior of the cooling unit. The thermal transfer unit can, for example, be positioned and configured to transfer thermal energy, or heat, from the interior of the medicinal storage container into the interior of the cooling unit.

In some embodiments, a medicinal storage container includes a base unit positioned beneath the medicinal storage container, the base unit including one or more walls substantially surrounding at least a region of the compressor system and the controller. For example, FIG. 1 illustrates a medicinal storage container 100 including a base unit 105. A base can be, for example, a frame or enclosed box-like structure fabricated from metal or plastic. A base can be, for example, of a sufficient height to position the top of the medicinal storage container for access by a user, such as a medical professional.

A medical storage container includes a desiccant unit including one or more external walls, the one or more external walls sealed together to form a gas-impermeable barrier around an interior desiccant region. In some embodiments, the external walls include a conductive material, such as a thermally conductive metal. The external walls include an aperture, the aperture sealed with a vapor- and liquid-impermeable seal to an end of the vapor conduit. In the embodiment shown in FIG. 1, the medicinal storage container 100 includes a desiccant unit 120. The desiccant unit includes a vapor-sealed chamber including an interior desiccant region in vapor contact with an interior region of the vapor conduit. The desiccant unit 120 shown in FIG. 1 is attached to the second end 185 of the vapor conduit 130. The desiccant unit includes a heating element positioned within the interior desiccant region. In the embodiment illustrated in FIG. 1, the desiccant unit 120 includes a heating element 127 in a substantially planar configuration along the wall distal to the interior evaporative region 110 of the cooling unit. In some embodiments, the heating element is an electric heating element. In some embodiments, the heating element is in a coiled configuration. Some embodiments include one or more thermal conduction elements affixed to the heating element, for example one or more thermally-conductive fins or flanges positioned to distribute heat from the heating element within the desiccant unit. In some embodiments, a heating element is positioned and configured to heat the desiccant material within the desiccant unit in an even distribution. In some embodiments, a heating element is positioned adjacent to an interior surface of a wall of a desiccant unit. In some embodiments, a heating element is positioned adjacent to an exterior surface of a wall of a desiccant unit. In some embodiments, a heating element is positioned externally to a wall of a desiccant unit, the heating element positioned and configured to heat desiccant material within the desiccant unit by conduction and/or convection.

In some embodiments, a desiccant unit includes one or more units of a desiccant material within the interior desiccant region. In some embodiments, a desiccant unit includes a gas pressure less than atmospheric pressure within the interior desiccant region. In some embodiments, a desiccant unit includes a gas pressure less than 1 torr within the interior desiccant region. In some embodiments, a desiccant unit includes a gas pressure less than 0.1 torr within the interior desiccant region. In some embodiments, a desiccant unit includes an open-cell metal foam positioned within the interior desiccant region, the open-cell metal foam positioned to distribute gas within the interior desiccant region. In some embodiments, a desiccant unit includes one or more pipes positioned within the interior desiccant region, the one or more pipes positioned to distribute gas within the interior desiccant region.

Some embodiments include insulation positioned adjacent to one or more external surfaces of a desiccant unit. The insulation can include, for example, less insulative capacity than the insulation surrounding the storage region in an embodiment. Some embodiments include an insulation unit positioned adjacent to one or more external surfaces of a desiccant unit. Some embodiments include a movable insulation unit positioned adjacent to one or more external surfaces of a desiccant unit. For example, a movable insulation unit can include a mechanical system to change the configuration of insulation positioned adjacent to one or more external surfaces of a desiccant unit. For example, a movable insulation unit can include sliding panels configured to be moved to cover relatively more or relatively less of the external surface of the desiccant unit over time. Some embodiments include a movable insulation unit configured to be wrapped around the exterior of a desiccant unit by a user, and then removed.

In some embodiments, a desiccant unit includes a one-way valve unit, the one-way valve unit configured to allow gas with a pressure beyond a preset limit to vent externally from the internal desiccant region of the desiccant unit. For example, a desiccant unit can include a blow-out valve, configured to open in case the gas pressure within the desiccant unit exceeds a predetermined maximum level. A one-way valve unit, can, for example, be a safety feature of the container.

A medicinal storage container includes a vapor conduit including a first end and a second end, the vapor conduit attached to an external surface of the one or more external walls surrounding the aperture of the desiccant unit at the first end, the vapor conduit attached to an external surface of the one or more external walls surrounding the aperture of the evaporative cooling unit at the second end, the vapor conduit forming an internal, gas-impermeable passageway between the interior desiccant region of the desiccant unit and the interior evaporative region of the cooling unit. A medicinal storage container also includes a vapor control unit attached to the vapor conduit, the vapor control unit operably attached to the controller. For example, FIG. 1 illustrates a vapor conduit 130 that is a non-linear tubular structure. The vapor conduit 130 includes a first end 180 sealed to an aperture 133 in the interior evaporative region 110 of the cooling unit. The vapor conduit 130 includes a second end 185 sealed to an aperture 135 in a well of the desiccant unit 120. The vapor conduit 130 shown in FIG. 1 is configured including a substantially vertical second end 185 affixed to a region of the first end 180 positioned at approximately 45 degrees from the vertical second end 185. The vapor conduit 130 includes a vapor control unit 140 affixed to the vapor conduit 130 at a position close to the junction of the substantially vertical second end 185 to the first end 180 positioned at approximately 45 degrees from the vertical second end 185. The vapor control unit 140 is connected to the controller 170 with a wire connector 145.

In some embodiments, a medicinal storage container includes a vapor conduit including a substantially tubular structure of sufficient length and diameter to inhibit thermal conduction between the at least one external wall of the desiccant unit and the at least one external wall of the cooling unit. In some embodiments, a medicinal storage container includes a vapor conduit configured to minimize conduction of thermal energy between the desiccant unit and the cooling unit. For example, the vapor conduit can be elongated and/or angled to minimize conduction of thermal energy between the desiccant unit and the cooling unit. In some embodiments, a medicinal storage container includes a vapor conduit including one or more thermal conduction elements affixed to an external surface of the vapor conduit. For example, the vapor conduit can include one or more thermal fins fabricated from a thermally conductive material affixed to an external surface of the vapor conduit. In some embodiments, a medicinal storage container includes a vapor conduit including: a gas-impermeable wall of the vapor conduit; a gas-impermeable seal between the first end of the vapor conduit and the desiccant unit; and a gas-impermeable seal between the second end of the vapor conduit and the cooling unit. In some embodiments, a medicinal storage container includes a vapor conduit including an externally-breakable seal across the internal passageway of the vapor conduit, the seal configured to prevent the flow of gas through the internal passageway of the vapor conduit. For example, the vapor conduit can include a thin, gas-impermeable film fabricated as a brittle seal occluding the internal diameter of the vapor conduit, the seal breakable by an external force, such as a sharp tap on the exterior of the vapor conduit at a position adjacent to the internal seal. In some embodiments, a medicinal storage container includes: a first temperature sensor positioned adjacent to the first end within the vapor conduit, the first temperature sensor operably attached to the controller; and a second temperature sensor positioned adjacent to the second end within the vapor conduit, the second temperature sensor operably attached to the controller.

The vapor conduit includes a vapor control unit affixed to the vapor conduit and to the controller. In some embodiments, the vapor control unit is entirely internal to the vapor conduit and not externally visible. In some embodiments, the vapor control unit is integral to the vapor conduit. The vapor control unit controllably increases and decreases the interior dimensions of a conduit internal to the vapor control unit, which serves to alter the rate of vapor flow through the vapor control unit and, therefore, between the first end of the vapor conduit and the second end of the vapor conduit. See: "Calculating Pipe Sizes & Pressure Drops in Vacuum Systems," Section 9—Technical Reference, Rietschle Thomas Company, which is incorporated by reference. In some embodiments, a vapor control unit includes at least one valve configured to control movement of gas through the internal passageway of the vapor conduit between the interior desiccant region of the desiccant unit and the interior evaporative region of the cooling unit, the at least one valve configured to operate in response to signals received from the controller. In some embodiments, a medicinal storage container includes an accelerometer connected to the controller, which is configured to send signals to close a valve within the vapor control unit if the container is flipped or tipped on its side.

In some embodiments, a vapor control unit includes a sensor positioned to sense one or more conditions within the interior of the vapor conduit. In some embodiments, a vapor control unit includes a temperature sensor. In some embodiments, a vapor control unit includes a pressure sensor. In some embodiments, a vapor control unit includes a vacuum sensor. A sensor can include, for example, depending on the embodiment, an electronic temperature sensor, a chemical temperature sensor, or a mechanical temperature sensor. A sensor can include, for example, a low-energy temperature sensor, such as a Thermodo device (Robocat, Copenhagen, Denmark). A sensor can include, for example, depending on the embodiment, an electronic gas pressure sensor, or a mechanical gas pressure sensor. A sensor for measurement of gas pressure can include a Bourdon tube. A sensor for measurement of gas pressure can include a diaphragm-based gas pressure sensor. A sensor for measurement of temperature can include, for example, a thermocouple. A sensor can include a combined sensor of gas pressure, gas composition, and temperature. For example, a sensor can include a NODE device, (Variable Technologies, Chattanooga Tenn.). In some embodiments, a sensor can include a power source, such as a battery. In some embodiments, a sensor is connected to the controller and receives power from the controller, such as through a wire connector.

Some embodiments include a sensor that is a temperature sensor. A temperature sensor can include, for example, a mechanical temperature sensor. A temperature sensor can include, for example, an electronic temperature sensor. By way of example, some embodiments include a sensor that is a temperature sensor including one or more of: a thermocouple, a bimetallic temperature sensor, an infrared thermometer, a resistance thermometer, or a silicon bandgap temperature sensor.

Some embodiments include a sensor that is a gas pressure sensor. A gas pressure sensor can include, for example, a mechanical gas pressure sensor, such as a Bourdon tube. A gas pressure sensor can include an expansion valve with a capillary tube. A gas pressure sensor can include, for example, an electronic gas pressure sensor. By way of example, some embodiments include a sensor that is a vacuum sensor. For example, the interior of a vapor conduit can be substantially evacuated, or at a low gas pressure relative to atmospheric pressure, before use of a container and then the vacuum reduced during evaporation from the evaporative liquid. Data from a vacuum sensor can, therefore, be indicative of the rate of evaporation, or the total level of evaporation of the evaporative liquid within the container. In some embodiments, a gas pressure sensor can include a piezoresistive strain gauge, a capacitive gas pressure sensor, or an electromagnetic gas pressure sensor. In some embodiments, a pressure sensor includes a capacitance pressure sensor.

The vapor conduit, including the vapor control unit, is configured to control vapor flow between the interior desiccant region of the desiccant unit and the interior evaporative region of the evaporative cooling unit. As shown in FIG. 1, in some embodiments the vapor conduit is configured as a tubular structure traversing between adjacent units. The vapor conduit is configured to allow sufficient gas, including evaporated vapor, to move to the interior desiccant region of the desiccant unit in situations where maximum evaporative cooling of the container is desired. Therefore, the size, shape and placement of the vapor conduit will depend on factors including the size of the container, the temperature ranges desired for the container, the level of reversible control of vapor movement within the vapor conduit, and the physical properties of the desiccant material and the liquid utilized in a particular embodiment. For example, in some embodiments the target temperature range of the storage region is between 0 and 10 degrees Centigrade, and the medicinal storage container includes approximately 1 liter of liquid water and a corresponding volume of desiccant material including calcium chloride to absorb greater than 1 liter of water. See "The Calcium Chloride Handbook, A Guide to Properties, Forms, Storage and Handling," DOW Chemical Company, dated August 2003, which is incorporated by reference herein. As an example, for some embodiments of a medicinal storage container with water as an evaporative liquid and calcium chloride as a desiccant material, wherein the portable cooling unit begins with a substantially evacuated interior (i.e. less than or equal to 300 mTorr of pressure), it is estimated that approximately 1 gram of water will evaporate for every hour that the valve is in a fully open position. Therefore, 1 liter of water and 1.5 kg of calcium chloride can maintain the evaporative cooling unit between approximately 6 degrees Centigrade and 9 degrees Centigrade for approximately a month with an external ambient temperature of approximately 25 degrees Centigrade. As an example, for some embodiments of a medicinal storage container with water as an evaporative liquid and calcium chloride as a desiccant material, wherein the portable cooling unit begins with a substantially evacuated interior (i.e. less than or equal to 300 mTorr of pressure), it is estimated that approximately 2-5 grams of water will evaporate for every hour that the valve is in a fully open position. The evaporative rate will depend on the configuration of the embodiment and the use case. Some embodiments include a sensor within the vapor control unit, operably connected to the controller with a wire connection. The sensor can include, for example, a temperature or pressure sensor. Some embodiments include a plurality of temperature sensors.

During use of the container, a temperature sensor positioned within the medicinal storage region can transmit data to the controller via a wire. The controller is configured to operably control the vapor control unit in response to the received data. In embodiments including an electronic controller, the electronic controller receives data from one or more temperature sensors affixed to the medicinal storage region, and determines if the detected values are outside or inside of a predetermined range. Depending on the determination, the electronic controller can initiate the valve to open or close to return the temperature or pressure to the predetermined range of values. For example, in some embodiments, if the electronic temperature sensor sends a signal including temperature data at 9 degrees Centigrade, the controller will determine that the received temperature data is outside of the predetermined range of 3 degrees Centigrade to 7 degrees Centigrade. In response to the determination, the controller will send a signal to a motor attached to a valve within the vapor control unit, the signal of a type to initiate the motor to open the valve. As another example, in some embodiments, if the electronic temperature sensor sends a signal including temperature data at 1 degree Centigrade, the controller will determine that the received temperature data is outside of the predetermined range of 3 degrees Centigrade to 7 degrees Centigrade. In response to the determination, the controller will send a signal to a motor attached to a valve within the vapor control unit, the signal of a type to initiate the motor to close the valve.

However, depending on the embodiment, different types of connections between the controller, a temperature sensor and a valve within the vapor control unit are possible. For example, in some embodiments, a vapor control unit includes a thermocouple configured to put physical pressure on a mechanical controller that transmits that physical pressure to a control element of a valve to result in the opening or closing of the valve. For example, in some embodiments, a temperature sensor includes an electronic temperature sensor that sends data regarding detected temperature over time to an electronic controller via a wire or wireless connection, such as through an IR transmission or short wavelength radio transmission (e.g. Bluetooth).

Figure 2:
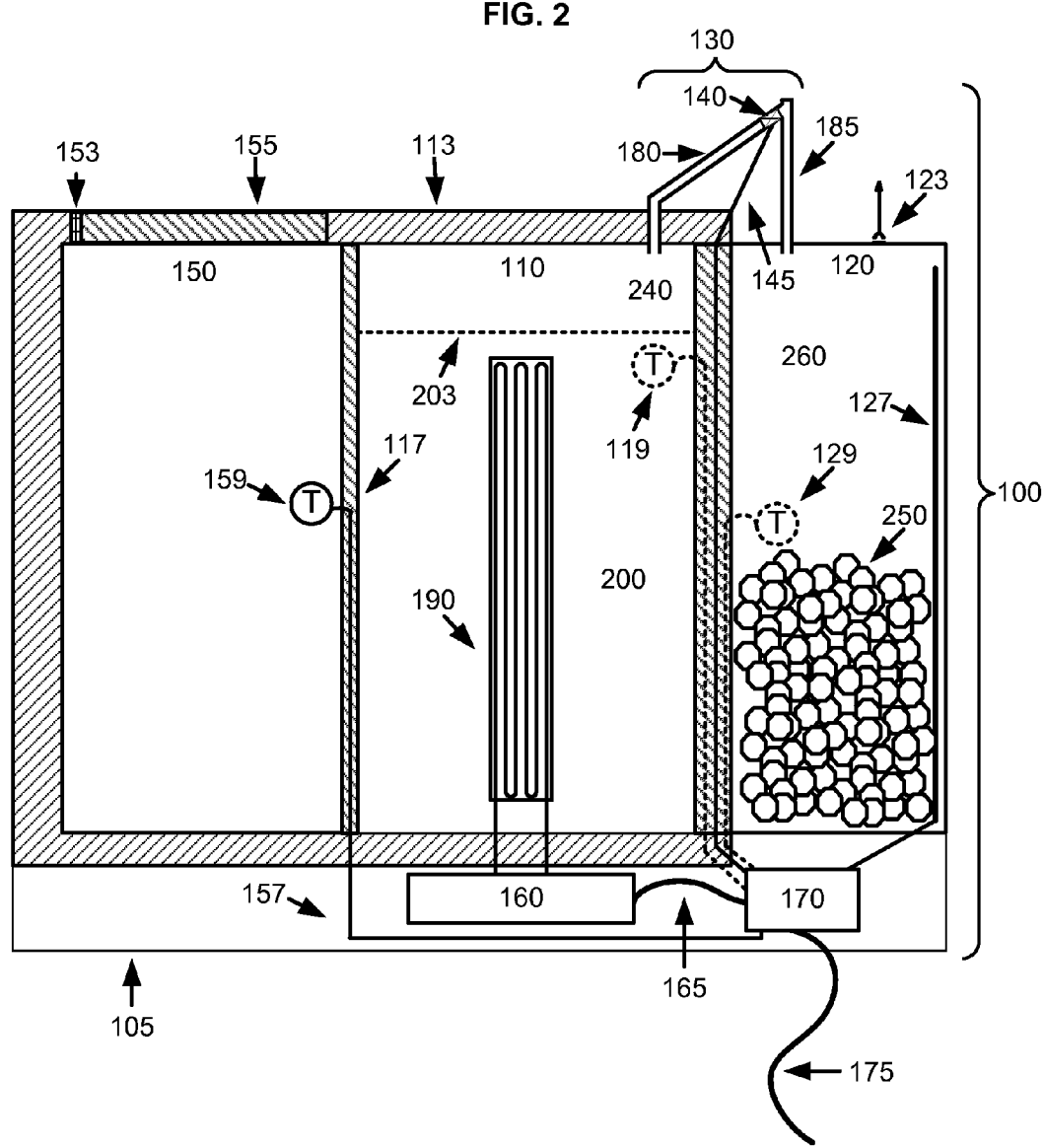
FIG. 2 is a schematic of a medicinal storage container.

FIG. 2 illustrates an embodiment of a medicinal storage container, illustrating aspects of the container in use. The embodiment shown in FIG. 2 has similarities with the embodiment illustrated in FIG. 1. In the view shown in FIG. 2, the evaporative region 110 includes an evaporative liquid 200 present in the lower portion of the evaporative region 110. The evaporative liquid 200 has a top surface 203 within the evaporative region 110 of the medical storage container 100. A space 240 is present above the top surface 203 of the evaporative liquid 200. The space 240 is positioned to allow gas and vapor to flow freely from the space 240 above the evaporative liquid 200 through the first end 180 of the conduit 130.

FIG. 2 also depicts desiccant material 250 positioned within the desiccant unit 120. The units of desiccant material 250 are fabricated from at least one material with desiccant properties, or the ability to remove liquid from a liquid vapor in the surrounding space. Units of desiccant material can operate, for example, through the absorption or adsorption of water from the water vapor in the surrounding space. One or more units of desiccant material selected will depend on the specific embodiment, particularly the volume required of a sufficient quantity of desiccant material to absorb liquid for the estimated time period required to operate a specific evaporative cooling unit integral to a specific container. In some embodiments, the units of desiccant material selected will be a solid material under routine operating conditions. One or more units of desiccant material can include non-desiccant materials, for example binding materials, scaffolding materials, or support materials. One or more units of desiccant material can include desiccant materials of two or more types. The medicinal storage containers described herein are intended for use with evaporative cooling for days or weeks, and sufficient desiccant material and corresponding evaporative liquid is included for those time periods in any given embodiment. For more information on liquid-desiccant material pairs, see: Saha et al., "A New Generation Cooling Device Employing $CaCl_2$-in-silica Gel-water System," *International Journal of Heat and Mass Transfer*, 52: 516-524 (2009), which is incorporated by reference. The selection of one or more desiccant materials for use in a specific embodiment will also depend on the target cooling temperature range in a specific embodiment. For example, in some embodiments the desiccant material can include calcium carbonate. For example, in some embodiments, the desiccant material can include lithium chloride. For example, in some embodiments, the desiccant material can include liquid ammonia. For example, in some embodiments, the desiccant material can include zeolite. For example, in some embodiments, the desiccant material can include silica. More information regarding desiccant materials is available in: Dawoud and Aristov, "Experimental Study on the Kinetics of Water Vapor Sorption on Selective Water Sorbents, Silica Gel and Alumina Under Typical Operating Conditions of Sorption Heat Pumps," *International Journal of Heat and Mass Transfer*, 46: 273-281 (2004); Conde-Petit, "Aqueous Solutions of Lithium and Calcium Chlorides:—Property Formulations for Use in Air Conditioning Equipment Design," *M. Conde Engineering*, (2009); "Zeolite/Water Refrigerators," BINE Informationsdienst, projektinfo 16/10; "Calcium Chloride Handbook: A Guide to Properties, Forms, Storage and Handling," Dow Chemical Company, (August, 2003); "Calcium Chloride, A Guide to Physical Properties," Occidental Chemical Corporation, Form No. 173-01791-0809P&M; and Restuccia et al., "Selective Water Sorbent for Solid Sorption Chiller: Experimental Results and Modelling," *International Jour-* nal of Refrigeration 27:284-293 (2004), which are each incorporated herein by reference. In some embodiments, a desiccant material is considered non-toxic under routine handling precautions. The selection of a desiccant material is also dependent on any exothermic properties of the material, in order to retain the thermal properties of the entire medicinal storage container desired in a specific embodiment.

During use, a medicinal storage container has different modes of operation depending on the conditions, including external power availability. In a situation where a reliable source of power is available, for example a steady municipal power supply or operational solar power, the controller can operate the evaporator coil sufficiently to maintain a steady temperature range within the medicinal storage region of the container. The information sent to the controller from at least one temperature sensor within the medicinal storage region, for example, can be the basis for the controller sending signals to turn on or off the compressor system as needed to maintain the appropriate temperature of the evaporative liquid. The evaporative liquid can act as a thermal ballast to maintain the temperature within the medicinal storage region in a preset range with minimal temperature flux. In some embodiments, the evaporator coil unit is configured to freeze the evaporative liquid to maintain an appropriate temperature within the medicinal storage region. In some embodiments, the evaporator coil unit is configured to chill the evaporative liquid to maintain an appropriate temperature within the medicinal storage region. In some embodiments, a medicinal storage container includes a battery configured to store some power reserves, for example sufficient to operate the controller in the absence of sufficient power to operate the compressor system.

At some point, it is expected that the power source for the medicinal storage container will no longer be available. For example, a municipal power system may not be operational due to emergency or lack of capacity, or solar power may not be available at night. The thermal mass of the evaporative liquid will maintain the temperature within the medicinal storage region for a period of time, depending on factors including the mass of the evaporative liquid, its thermal properties, the insulation parameters of the medicinal storage container, the temperature range of the storage region, and the ambient temperature to the container. When power to operate the compressor system is not available, the controller will continue to operate based on reserve power, such as provided by a battery. At a time when a temperature sensor sends a signal to the controller indicating that the medicinal storage region requires cooling to maintain the medicinal storage region within the appropriate temperature range, the controller can then open the valve within the vapor control unit to increase evaporation of the evaporative liquid and access of the vapor from the evaporative liquid to the desiccant. This will result in cooling of the evaporative liquid, which will then continue to act as a thermal ballast to the medicinal storage region in the appropriate temperature range.

Over time, part of the mass of evaporative liquid initially present in the cooling unit will be transferred to the interior of the desiccant unit as vapor moving through the vapor conduit. The container will periodically, therefore, require a recharging of the evaporative liquid from the desiccant unit through the vapor conduit in order to maintain the functionality of the container. Since the interior of the cooling unit, the vapor conduit, and the desiccant unit are a gas-sealed and liquid-sealed continuous region, the evaporative liquid can be returned to the cooling unit, as vapor, to recharge the system. In some embodiments, a controller includes circuitry for operation of a recharge cycle of the container. In some embodiments, a controller is configured to accept input from a user to start a recharge cycle, such as through a button or similar user input device operably connected to the controller.

The controller activates the recharge cycle for the system based on factors predetermined for a particular embodiment, including the supply of external power available, the ambient temperature, the temperature of the evaporative liquid currently present in the cooling unit, the temperature within the medicinal storage area, and in some embodiments input from a user. During recharge, the controller initiates heating of the heating element positioned within the interior desiccant region of the desiccant unit. The heater is activated to a predetermined temperature for a preset period of time. The time and temperature settings for the heating element depend on the embodiment, for example the type of desiccant and evaporative liquid present in the container, and the size and shape of the desiccant unit and its interior desiccant region. For example, in some embodiments, a heating element is held at 300 degrees Centigrade for at least 30 minutes during the recharge cycle. For example, in some embodiments, a heating element is held at 250 degrees Centigrade for at least 60 minutes during the recharge cycle. During the time when the heating element is hot, the evaporative liquid associated with the desiccant within the desiccant unit converts into vapor. The vapor moves through the vapor conduit and condenses within the relatively cool interior evaporative region of the cooling unit. After the heating element is turned off, the desiccant unit can cool down, for example through radiant cooling, and the recharge cycle is completed. In some embodiments, the controller is configured to only initiate the recharge cycle when the compressor system is operational, in order to ensure that the evaporative liquid will condense within the interior evaporative region of the cooling unit. In some embodiments, the controller is configured to only initiate the recharge cycle when the ambient temperature to the container is below a predetermined threshold level, in order to ensure sufficient radiant heating for the cool-down process. In some embodiments, the desiccant unit includes a one-way blow valve configured to open in case the gas pressure within the desiccant unit exceeds a threshold level.

It is expected that the recharge system can operate many times over the lifetime use of the container without replacement of the desiccant or evaporative liquid. For example, assuming that a medicinal storage container will have monthly recharging and be in operational use for 10 years, a container will include a desiccant and evaporative liquid in a configuration of the container that is expected to be rechargeable for reuse at least 120 times (12 times per year for 10 years). For example, assuming that a medicinal storage container will have bi-weekly recharging and be in operational use for 5 years, a container will include a desiccant and evaporative liquid in a configuration of the container that is expected to be rechargeable for reuse at least 130 times (26 times per year for 5 years). In some embodiments, a medicinal storage container is configured for recharging at least 200 times over the multi-year use of the container without replacement of the desiccant or evaporative liquid.

A medical storage container is configured to operate efficiently in low and/or intermittent power availability situations. A medicinal storage container is configured to operate efficiently using a compressor-based cooling system when power is available. When power is not available, the evaporative liquid can serve as thermal ballast to maintain cooling to the medicinal storage region. When the evaporative liquid warms beyond a predetermined temperature, it can be re-cooled in the absence of external power through evaporative cooling. In addition, the container can recharge the evaporative cooling system as needed, when external power is available and conditions warrant.

Figure 3:
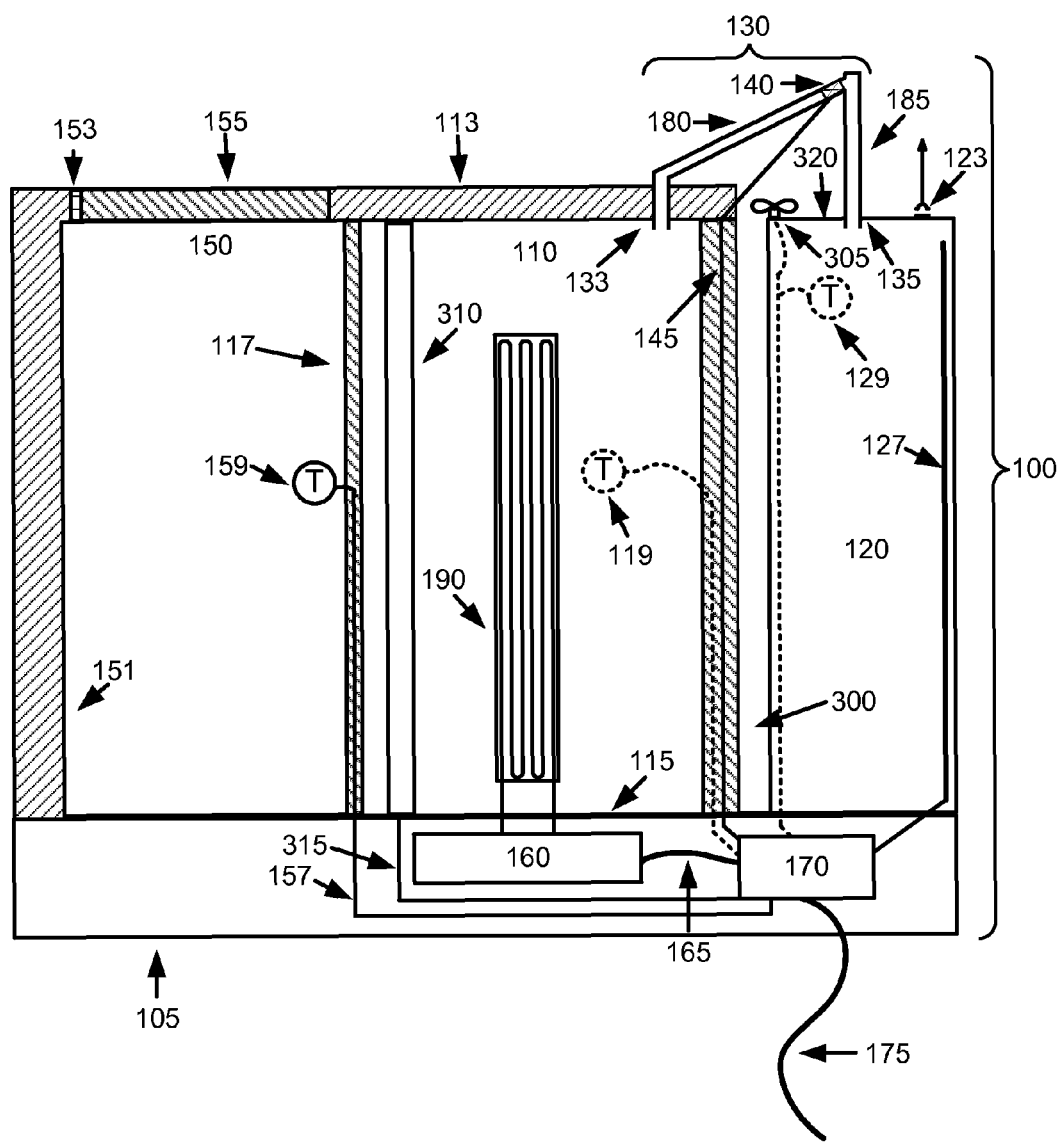
FIG. 3 is a schematic of a medicinal storage container.

FIG. 3 illustrates aspects of a medicinal storage container 100. The embodiment shown in FIG. 3 includes a medicinal storage unit including external walls 151 encircling a medicinal storage region 150, the medicinal storage region 150 including a temperature sensor 159 operably connected to the controller 170 with a wire connector 157. The medicinal storage container 100 shown in FIG. 3 also includes a cooling unit including external walls 115, the external walls 115 sealed together to form a gas-impermeable and liquid-impermeable barrier around an interior evaporative region 110, the external walls including an aperture 133. The medicinal storage container 100 includes a desiccant unit including external walls 320 sealed together to form a gas-impermeable barrier around an interior desiccant region 120, the external walls 320 including an aperture 135. The medicinal storage container 100 includes a vapor conduit 130 including a first end 180 and a second end 185, the vapor conduit 130 attached to an external surface of the external walls 320 surrounding the aperture 135 of the desiccant unit at the second end 185, the vapor conduit 130 attached to an external surface of the external walls 115 surrounding the aperture 133 of the evaporative cooling unit at the first end 180, the vapor conduit 130 forming an internal, gas-impermeable passageway between the interior desiccant region 120 of the desiccant unit and the interior evaporative region 110 of the cooling unit. The medicinal storage container 100 also includes a heating element 127 positioned within the interior desiccant region 120, and a controller 170 operably attached to the heating element 127. The illustrated embodiment includes a compressor system 160 including an evaporator coil unit 190 positioned within the interior evaporative region 110 of the cooling unit, the compressor system 160 operably connected to the controller 170.

Some embodiments include at least one liquid level sensor positioned within the interior evaporative region of the evaporative cooling unit, the liquid level sensor positioned and configured to detect the evaporative liquid level within the interior evaporative region. For example, in some embodiments a liquid level sensor is positioned and configured to detect the surface of the evaporative liquid (e.g. the surface 203 shown in FIG. 2). For example, in some embodiments a liquid level sensor is positioned and configured to detect that the evaporative liquid level is at least as high as a specific position, for example a minimal position predetermined to ensure sufficient evaporative liquid present to maintain the thermal properties of the evaporative cooling unit. In the embodiment shown in FIG. 3, the interior evaporative region 110 encloses a liquid level sensor 310. In some embodiments, a liquid level sensor is a Hall effect sensor.

In some embodiments, a medicinal storage container includes a gap positioned between an exterior surface of the one or more external walls of the desiccant unit and an exterior surface of the one or more external walls of the cooling unit. The embodiment shown in FIG. 3 includes a gap 300 positioned between the exterior wall 320 of the desiccant unit and the adjacent exterior wall 115 of the evaporative cooling unit. A gap can be configured, for example, as an empty space between the adjacent sides of the evaporative cooling unit and the desiccant unit, the gap of sufficient size and shape to promote radiant cooling of the desiccant unit with minimal transfer of heat to the evaporative cooling unit. In the embodiment shown in FIG. 3, the evaporative cooling unit and the desiccant unit are both affixed to a base 105 of the medicinal storage container 100 at the lower faces of the units.

In some embodiments, a medicinal storage container includes; a gap positioned between an exterior surface of the one or more external walls of the desiccant unit and an exterior surface of the one or more external walls of the cooling unit; and a fan affixed to the exterior surface of the one or more external walls of the desiccant unit, the fan of a size, shape and position to circulate air within the gap. In some embodiments, the fan is a passively-controlled fan, configured to operate when the temperature in the gap reaches a preset temperature. In some embodiments, the fan is configured to operate whenever the heating element within the desiccant unit is operational. Some embodiments include a plurality of fans positioned within and/or around the gap, the fans oriented and configured to increase air flow within the gap.

For example, FIG. 3 illustrates an embodiment including a gap 300 positioned between a side wall of the desiccant unit and an adjacent side wall of the evaporative cooling unit. The medicinal storage container 100 shown in FIG. 3 also includes a fan 305 positioned at the top edge of the gap 300, the fan configured to circulate air within the gap 300. In some embodiments, the operation of a fan positioned adjacent to a gap is controlled by the controller. In some embodiments, the operation of a fan positioned adjacent to a gap is controlled by the controller in response to information from a temperature sensor positioned within the interior of the desiccant unit. In the embodiment illustrated, the fan 305 is connected to the controller 170 with a wire connector. In the embodiment illustrated, a temperature sensor 129 is also connected to the controller 170 with a wire connector.

Some embodiments include wherein there is at least one temperature sensor positioned within the first end of the vapor conduit, and at least one temperature sensor positioned within the second end of the vapor conduit. The temperature sensors positioned within the first end of the vapor conduit and the second end of the vapor conduit can be operably attached to the controller. The temperature sensors positioned within the first end of the vapor conduit and the second end of the vapor conduit can be configured to send sensor data to the controller with a wired or wireless connection. The controller can be configured to operate the vapor control unit, for example adjusting the opening and closing state of a valve within the vapor control unit, in response to sensor data from the temperature sensors positioned within the first end of the vapor conduit and the second end of the vapor conduit as well as sensor data from the temperature sensor positioned within the medicinal storage region of the container.

Figure 4:
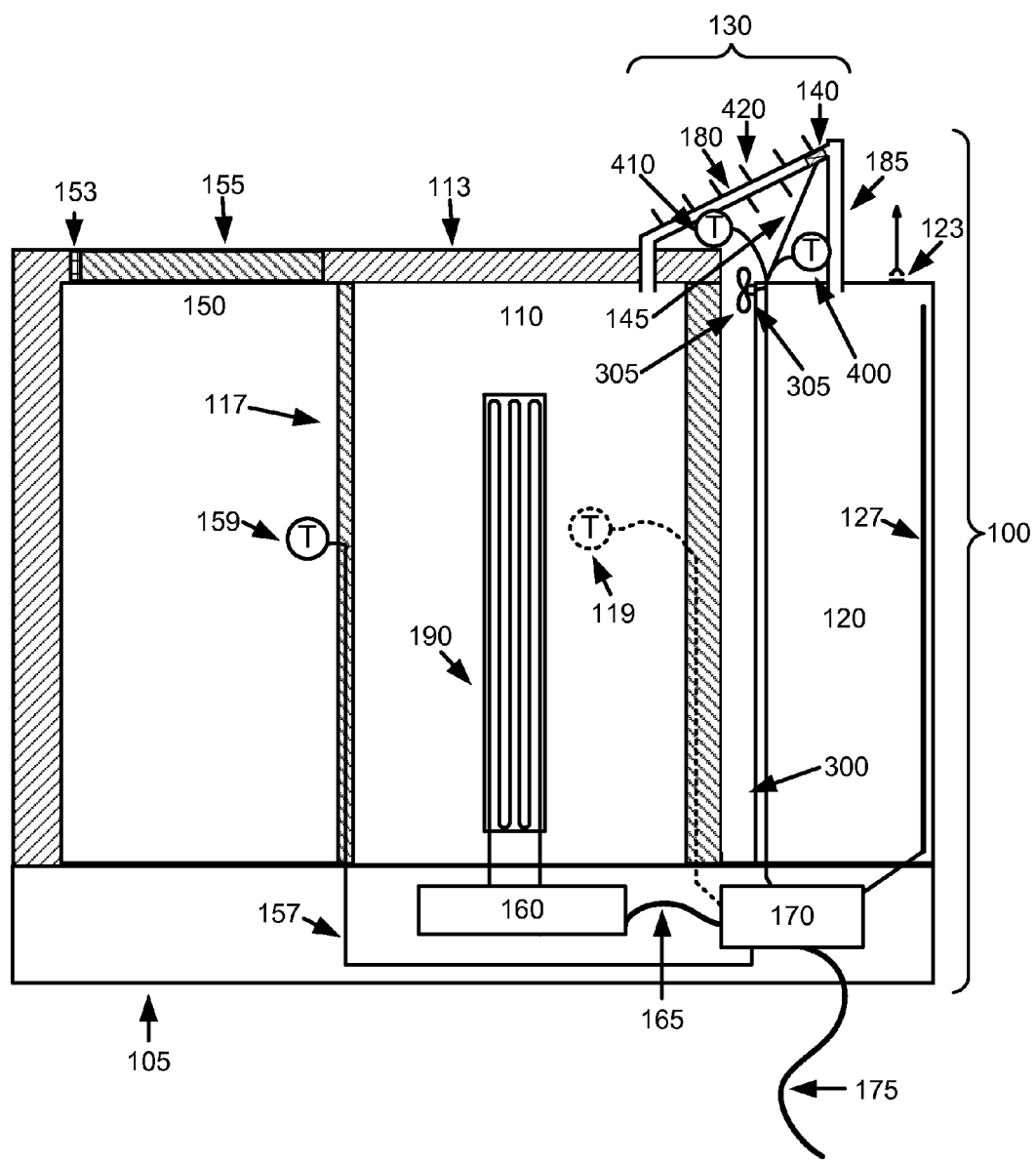
FIG. 4 is a schematic of a medicinal storage container.

FIG. 4 illustrates aspects of an embodiment of a medicinal storage container 100. The illustrated embodiment includes a first temperature sensor 410 positioned within the first end 180 of the vapor conduit 130, and a second temperature sensor 400 positioned within the second end 185 of the vapor conduit 130. Both the first temperature sensor 410 and the second temperature sensor 400 are attached to the controller 170 with a wire connector 145. The container 100 also includes a gap 300 positioned between an exterior wall of the desiccant unit and an adjacent exterior wall of the evaporative cooling unit. A fan 305 is positioned within the gap.

Some embodiments include a vapor conduit with a plurality of thermal conduction elements affixed to an external surface. In the embodiment illustrated in FIG. 4, for example, the first end 180 of the vapor conduit 130 includes a plurality of thermal conduction elements 420 that are thermal fins attached to the exterior surface of the conduit. Some embodiments include thermal conduction elements that are thermal fins attached to the interior surface of the conduit, the fins positioned within the interior space of the conduit. The thermal conduction elements are configured and positioned to increase thermal radiation from the vapor conduit, for example to encourage condensation of evaporative liquid on the interior surface of the vapor conduit.

Some embodiments are configured for use with one or more evaporative liquids in a frozen state. For example, when external power is available, a compressor system can be configured to operate the refrigerator coils within an evaporative cooling unit to a temperature below the freezing point of the particular evaporative liquid(s) in use with the container. The frozen evaporative liquid can be utilized as thermal ballast at times when external power is not available or insufficient, or to maintain the interior of the medicinal storage region at a temperature below the freezing point of the evaporative liquid.

Figure 5:
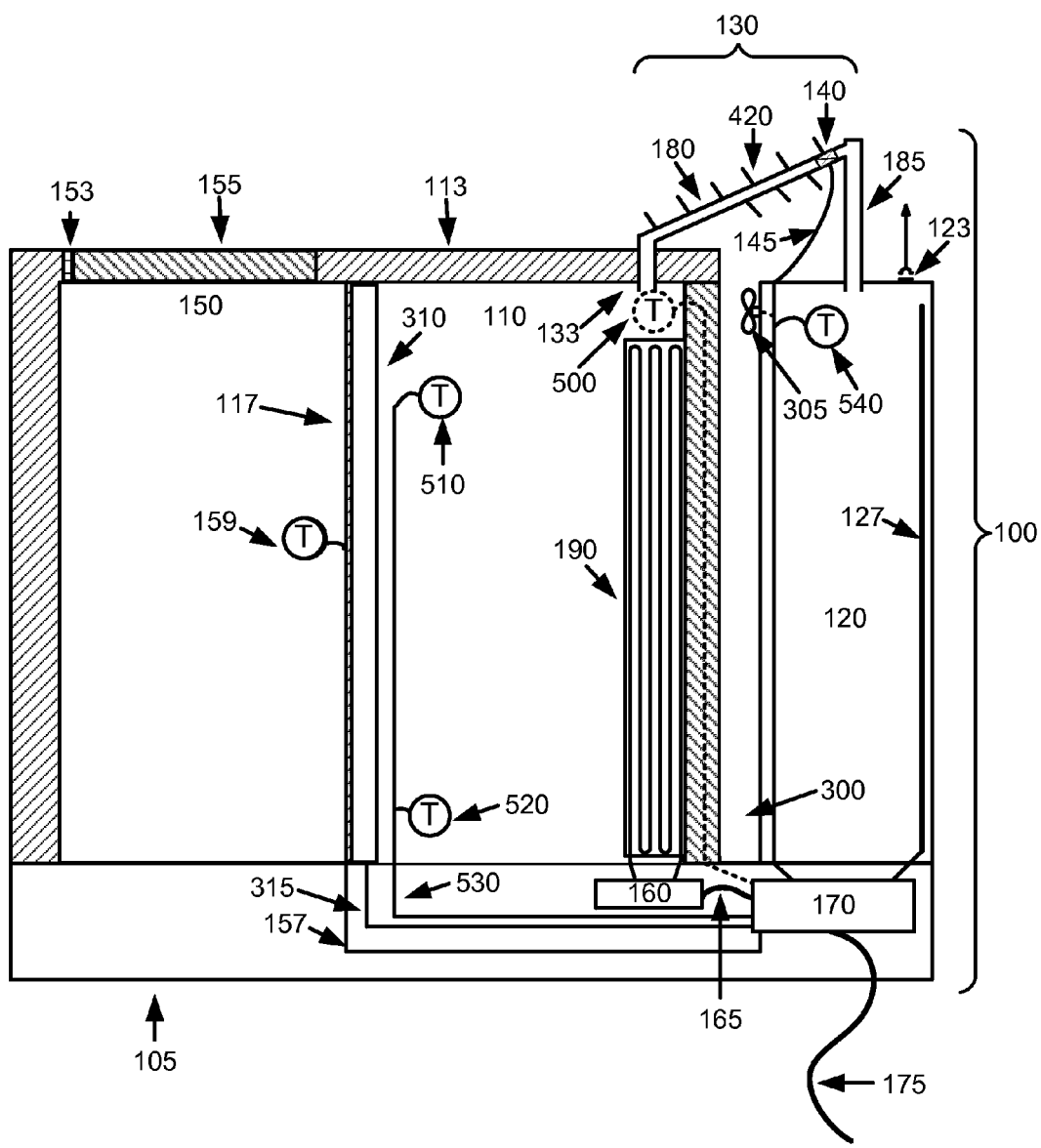
FIG. 5 is a schematic of a medicinal storage container.

FIG. 5 illustrates aspects of an embodiment of a medicinal storage container 100. In the embodiment illustrated, the container 100 includes a medicinal storage region 150 with a temperature sensor 159 positioned within the storage region. The temperature sensor 159 is connected to the controller 170 with a wire connector 157. The container 100 includes a liquid level sensor 310 positioned within the interior evaporative region 110 of the cooling unit. The liquid level sensor 310 is positioned close to the wall of the cooling unit adjacent to the medicinal storage region 150. The liquid level sensor is configured to send information regarding the detected liquid level to the controller 170 though a wire connector 315. The interior evaporative region 110 of the cooling unit also includes an evaporative coil unit 190 positioned close to the wall of the cooling unit adjacent to the desiccant unit, which opposes the wall of the cooling unit adjacent to the medicinal storage region 150. Two temperature sensors 510, 520 are positioned within the interior evaporative region 110 of the cooling unit, one of the temperature sensors 510 positioned adjacent to an upper region of the liquid level sensor 310, one of the temperature sensors 520 positioned adjacent to a lower region of the liquid level sensor 310. The temperature sensors 510, 520 positioned adjacent to the liquid level sensor 310 are configured to send temperature sensor data to the controller 170 thought a wire connector 530. The container 100 can optionally include a third temperature sensor 500 positioned adjacent to the aperture 133 in the external wall of the cooling unit affixed to the first end 180 of the vapor conduit 130.

Figure 6:
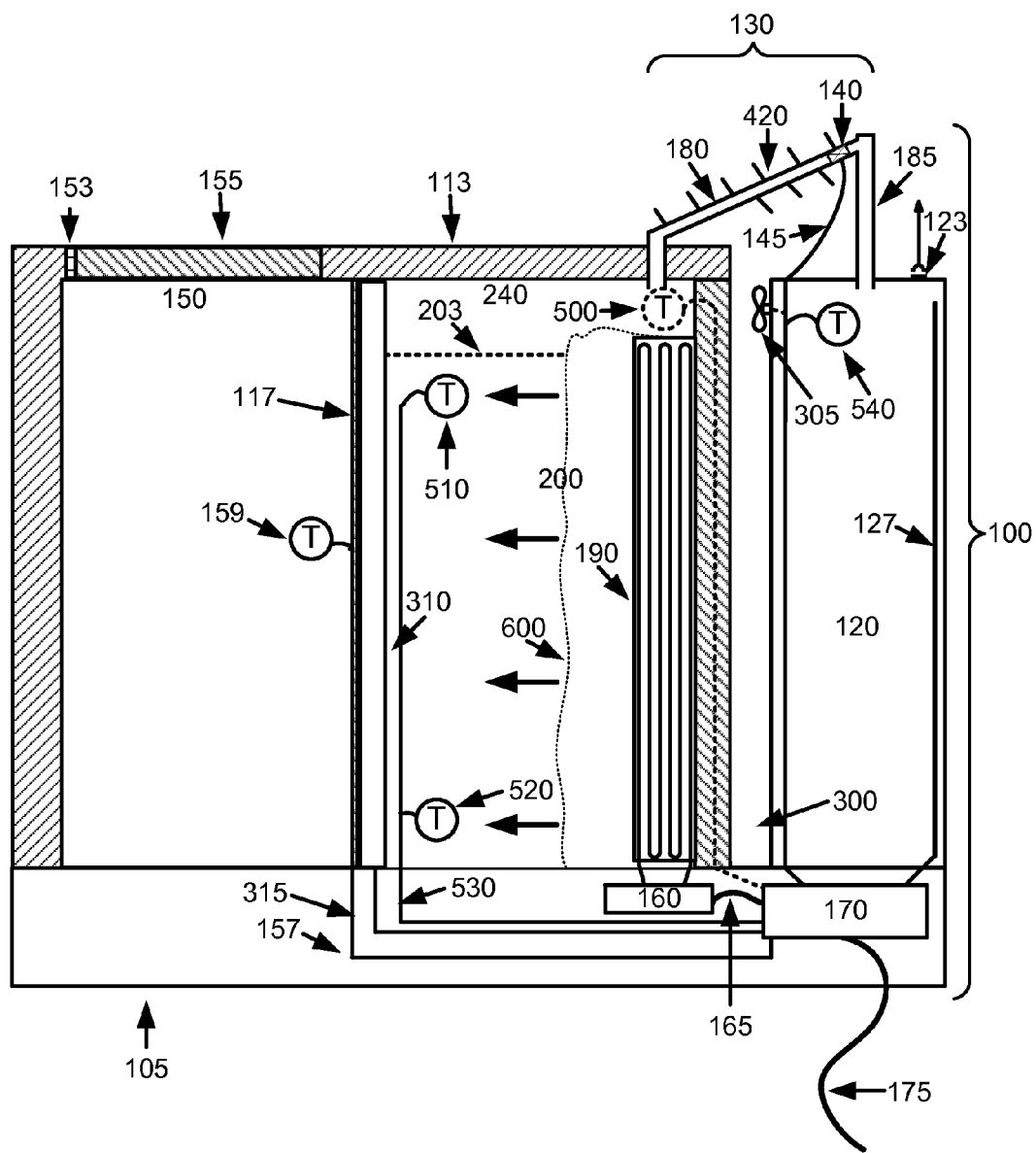
FIG. 6 is a schematic of a medicinal storage container.

FIG. 6 illustrates aspects of a medicinal storage container 100 like the one shown in FIG. 5 during a phase of its use cycle. At the stage illustrated, external power has been available and the compressor system 160 has been operational to cool the evaporative coil unit 190 within the interior evaporative region 110 of the cooling unit to a temperature below the freezing temperature of the evaporative liquid. For example, in some embodiments the evaporative liquid is water, and the evaporative coil unit can cool the water to below 0 degrees Centigrade. In the embodiment and stage illustrated in FIG. 6, the evaporative liquid 200 includes a frozen section adjacent to the evaporative coil unit 190 and a liquid section adjacent to the liquid level sensor 310. The liquid section of the evaporative liquid 200 has a liquid surface 203 within the interior evaporative region 110 of the cooling unit. The frozen section of the evaporative liquid 200 has a face 600 positioned within the interior evaporative region 110 of the cooling unit at a position between the evaporative coil unit 190 and the temperature sensors 510, 520 positioned adjacent to the liquid level sensor 190.

In an embodiment and use case similar to that shown in FIG. 6, the compressor system can operate when sufficient external power is available. The compressor system can cool the evaporative liquid within the interior evaporative region of the cooling unit to a temperature below the freezing temperature of the evaporative liquid through the evaporative coil unit. Over time, some of the evaporative liquid will freeze (as illustrated, for example, in FIG. 6). If the external power supply ends or is interrupted, the cooled and frozen evaporative liquid can serve as thermal ballast for continued cooling of the medicinal storage region. If the external power supply continues for a sufficient period of time, the temperature sensors within the interior evaporative region of the cooling unit will provide information to the controller that the interior evaporative region is close to being filled with frozen evaporative liquid. Similarly, the liquid level sensor can, in some embodiments, be configured to send information to the controller when the liquid is starting to freeze and the liquid level sensor is no longer operating as expected in free-flowing liquid. In response to information received, the controller can send a signal to the compressor system to stop or reduce the operation of the evaporative coil unit. The controller can, subsequently, send a signal to the compressor system to start or increase the operation of the evaporative coil unit at a later time in response to new information received from one or more of the temperature sensors or the liquid level sensor.

In some embodiments, a medicinal storage container includes: a desiccant unit including one or more external walls, the one or more external walls sealed together to form a gas-impermeable barrier around an interior desiccant region, the one or more external walls including an aperture; a heating element positioned within the interior desiccant region; a controller operably attached to the heating element; a cooling unit including one or more external walls, the one or more external walls sealed together to form a gas-impermeable and liquid-impermeable barrier around an interior evaporative region, the one or more external walls including an aperture; a compressor system including at least one evaporator coil unit positioned within the interior evaporative region of the cooling unit, the compressor system operably connected to the controller; a freezer unit including one or more walls, the freezer unit in thermal contact with the at least one evaporator coil unit positioned within the interior evaporative region of the cooling unit; a vapor conduit including a first end and a second end, the vapor conduit attached to an external surface of the one or more external walls surrounding the aperture of the desiccant unit at the first end, the vapor conduit attached to an external surface of the one or more external walls surrounding the aperture of the evaporative cooling unit at the second end, the vapor conduit forming an internal, gas-impermeable passageway between the interior desiccant region of the desiccant unit and the interior evaporative region of the cooling unit; a vapor control unit attached to the vapor conduit, the vapor control unit operably attached to the controller; and a medicinal storage unit including one or more external walls encircling a medicinal storage region, the medicinal storage region including at least one temperature sensor operably connected to the controller.

Figure 7:
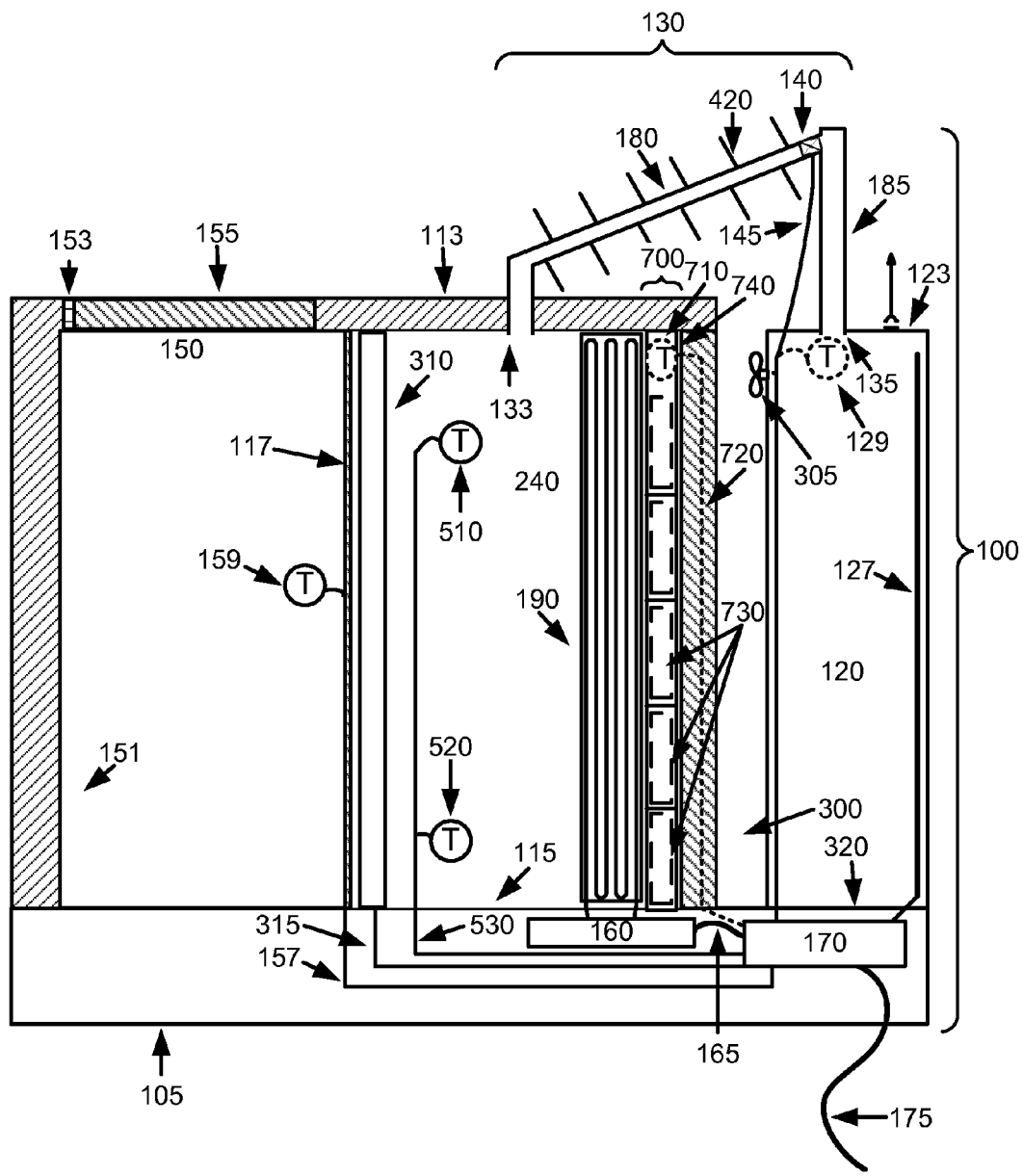
FIG. 7 is a schematic of a medicinal storage container.

FIG. 7 illustrates an embodiment of a medicinal storage container 100. In some embodiments, a medicinal storage container 100 includes a desiccant unit including external walls 320, the external walls 320 sealed together to form a gas-impermeable barrier around an interior desiccant region 120, the external walls 320 including an aperture 135. The embodiment shown in FIG. 7 includes a heating element 127 positioned within the interior desiccant region 120. The heating element 127 is attached to a controller 170 of the medicinal storage container 100 with a wire connector. FIG. 7 also depicts an embodiment of a medicinal storage container 100 including a cooling unit including external walls 115, the external walls 115 sealed together to form a gas-impermeable and liquid-impermeable barrier around an interior evaporative region 240, the external walls 115 including an aperture 133. The illustrated embodiment includes a compressor system 160 including an evaporator coil unit 190 positioned within the interior evaporative region 240 of the cooling unit, the compressor system 160 operably connected to the controller 170. In the embodiment illustrated, the evaporator coil unit 190 is positioned distal to the exterior wall 115 of the cooling unit adjacent to the medicinal storage region 150 of the container 100. The illustrated embodiment also includes a freezer unit 700 including external walls 740, the freezer unit 700 in thermal contact with the evaporator coil unit 190 positioned within the interior evaporative region 240 of the cooling unit. FIG. 7 shows an embodiment of a medicinal storage container 100 including a vapor conduit 130 including a first end 180 and a second end 185, the vapor conduit 130 attached to an external surface of the external walls surrounding the aperture 135 of the desiccant unit at the second end 185, the vapor conduit 130 attached to an external surface of the external walls 115 surrounding the aperture 133 of the evaporative cooling unit at the first end 180, the vapor conduit 130 forming an internal, gas-impermeable passageway between the interior desiccant region 120 of the desiccant unit and the interior evaporative region 240 of the cooling unit. In the embodiment illustrated, a vapor control unit 140 is attached to the vapor conduit 130 and also attached to the controller 170 with a wire connector 145. The illustrated embodiment includes a medicinal storage unit including external walls 151 encircling a medicinal storage region 150, the medicinal storage region 150 including a temperature sensor 159 operably connected to the controller 170.

FIG. 7 illustrates an embodiment of a medicinal storage container 100 including a freezer unit 700 positioned adjacent to the evaporator coil unit 190 positioned within the interior evaporative region 240 of the cooling unit. As shown in FIG. 7, in some embodiments a freezer unit 700 includes one or more walls 740 of a size, shape and position to hold one or more ice packs 730 in position. Depending on the embodiment, the walls of a freezer unit can be of a size, shape and position to secure one or more WHO-approved standard ice packs in the freezer unit. In some embodiments, the walls of a freezer unit are fabricated from a thermally-conductive material, such as a thermally-conductive metal. In some embodiments, the walls of a freezer unit are fabricated from aluminum or copper. In some embodiments, a freezer unit includes: an aperture of a size, shape and position for a user to access material within the freezer unit, and a cover reversibly affixed to the aperture. For example, a cover can include an insulated cover positioned and configured to reduce heat leak from the freezer unit when the cover is in place, but to allow a user to reversibly remove the cover as needed to remove or replace one or more freezer packs from the freezer unit. Some embodiments include a temperature sensor operably attached to the controller. FIG. 7 illustrates an embodiment of a medicinal storage container 100 including a freezer unit 700 with a temperature sensor 710 positioned to detect the temperature within the freezer unit 700. In the embodiment shown, the temperature sensor 710 is connected to the controller 170 with a wire connector 720. The controller is configured to accept information from the temperature sensor, such as temperature data.

In some embodiments, a freezer unit of a medicinal storage container includes a thermally-conductive wall with a first side positioned adjacent to an internal freezer region, and a second side positioned in thermal contact with an exterior surface of the at least one evaporator coil unit. For example, FIG. 7 depicts a freezer unit 700 including a wall 740 fabricated from a thermally conductive material, such as aluminum. The freezer unit wall 740 positioned to the left side of the freezer unit 700 in the view shown in FIG. 7 has a first side positioned adjacent to an internal freezer region, (e.g. to the right side relative to the view of FIG. 7) and a second side (e.g. to the left side relative to the view of FIG. 7) positioned in thermal contact with an exterior surface of the evaporator coil unit 190. In some embodiments, the first side and the second side are opposing sides of the wall, as shown in FIG. 7.

Some embodiments of a medicinal storage container include: a desiccant unit including one or more external walls, the one or more external walls sealed together to form a gas-impermeable barrier around an interior desiccant region, the one or more external walls including an aperture; a heating element positioned within the interior desiccant region; a controller operably attached to the heating element; a cooling unit including one or more external walls, the one or more external walls sealed together to form a gas-impermeable and liquid-impermeable barrier around an interior evaporative region, the one or more external walls including an aperture; a compressor system including at least one evaporator coil unit positioned within the interior evaporative region of the cooling unit, the compressor system operably connected to the controller; a vapor conduit including a first end and a second end, the vapor conduit attached to an external surface of the one or more external walls surrounding the aperture of the desiccant unit at the second end, the vapor conduit attached to an external surface of the one or more external walls surrounding the aperture of the evaporative cooling unit at the first end, the vapor conduit forming an internal, gas-impermeable passageway between the interior desiccant region of the desiccant unit and the interior evaporative region of the cooling unit; a vapor control unit attached to the vapor conduit, the vapor control unit operably attached to the controller; a thermal control unit attached to the vapor conduit, the thermal control unit operably attached to the controller; and a medicinal storage unit including one or more external walls encircling a medicinal storage region, the medicinal storage region including at least one temperature sensor operably connected to the controller.

Figure 8:
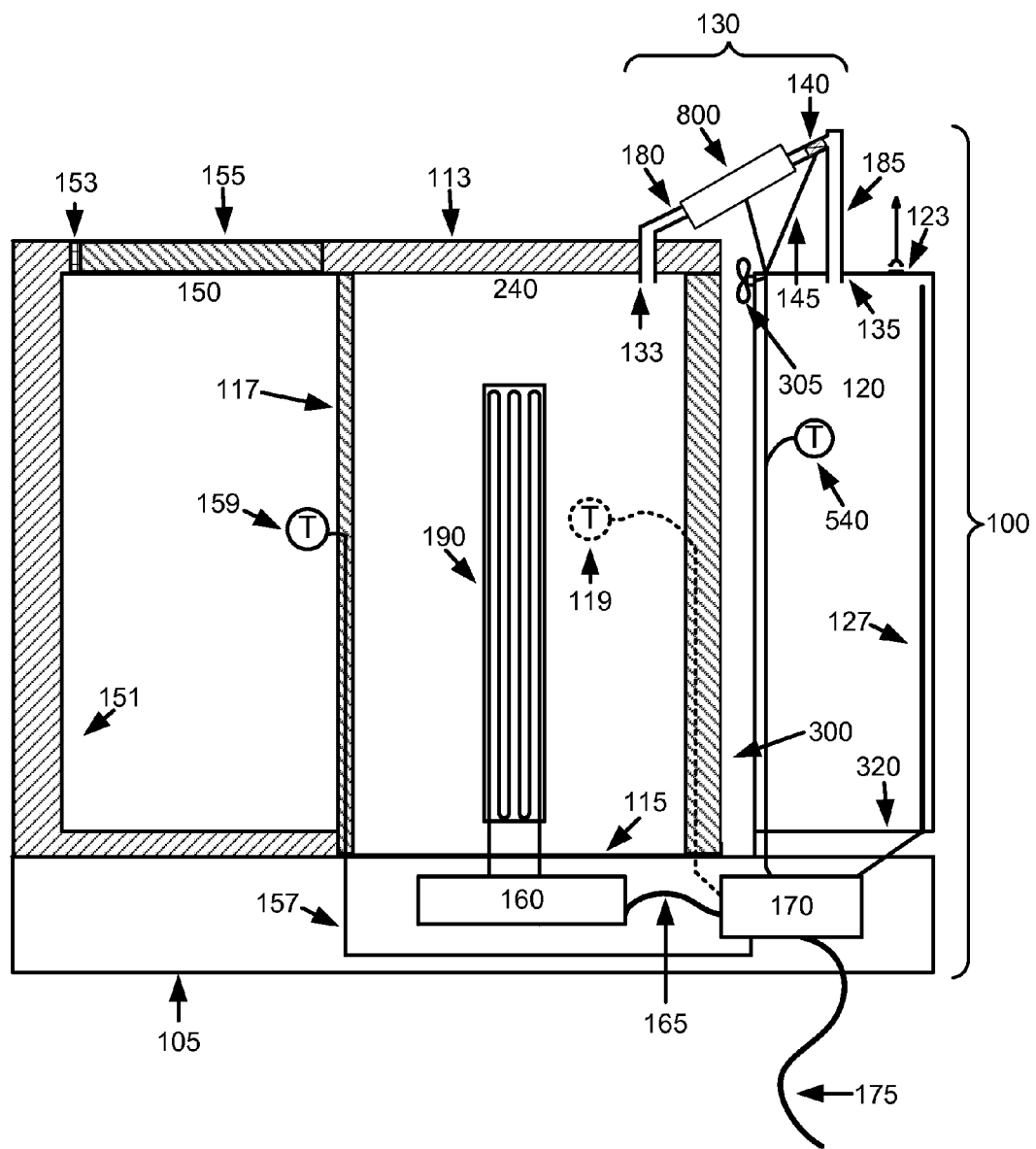
FIG. 8 is a schematic of a medicinal storage container.

For example, FIG. 8 depicts a medicinal storage container 100 including a desiccant unit including external walls 320, the external walls 320 sealed together to form a gas-impermeable barrier around an interior desiccant region 120, the external walls 320 including an aperture 135. The embodiment shown in FIG. 8 also includes a heating element 127 positioned within the interior desiccant region 120, and a controller 170 operably attached to the heating element 12 with a wire connector. The embodiment includes a cooling unit including external walls 115, the external walls 115 sealed together to form a gas-impermeable and liquid-impermeable barrier around an interior evaporative region 240, the external walls 115 including an aperture 133. The illustrated embodiment also includes a compressor system 160 including an evaporator coil unit 190 positioned within the interior evaporative region 240 of the cooling unit, the compressor system 160 operably connected to the controller 170 with a wire connector 165. The embodiment shown includes a vapor conduit 130 including a first end 180 and a second end 185, the vapor conduit 130 attached to an external surface of the external walls 320 surrounding the aperture 135 of the desiccant unit at the second end 185, the vapor conduit 130 attached to an external surface of the external walls 115 surrounding the aperture 133 of the evaporative cooling unit at the first end 180, the vapor conduit 130 forming an internal, gas-impermeable passageway between the interior desiccant region 120 of the desiccant unit and the interior evaporative region 240 of the cooling unit, and a vapor control unit 140 attached to the vapor conduit 130, the vapor control unit 140 operably attached to the controller 170 with a wire connector 145. The embodiment shown in FIG. 8 includes a medicinal storage unit including external walls 151 encircling a medicinal storage region 150, the medicinal storage region 150 including a temperature sensor 159 operably connected to the controller 170 with a wire connector 157.

The illustrated embodiment also includes a thermal control unit 800 attached to the vapor conduit 130. The thermal control unit 800 shown is attached to the exterior of the vapor conduit 130 adjacent to the first end 180. The thermal control unit 800 is operably attached to the controller 170 with a wire connector 145. In some embodiments, a thermal control device includes a peltier device positioned with a cooling surface adjacent to an external surface of the vapor conduit. For example, a peltier device can be configured and positioned on the vapor conduit at location calculated to cool the interior surface of the vapor conduit sufficiently to promote condensate from the evaporative liquid to form in the vapor conduit and to return to the interior of the interior evaporative region of the cooling unit through gravity flow. In some embodiments, a thermal control device includes an evaporator coil unit in thermal contact with the vapor conduit, the evaporator coil unit attached to a compressor system. For example, the evaporator coil unit can be a distinct evaporator coil from those within the cooling unit, and independently controllable by the controller. For example, the evaporator coil unit can be a parallel evaporator coil to those within the cooling unit. For example, evaporator coil unit can be configured and positioned on the vapor conduit at location calculated to cool the interior surface of the vapor conduit sufficiently to promote condensate from the evaporative liquid to form in the vapor conduit and to return to the interior of the interior evaporative region of the cooling unit through gravity flow. A thermal control unit can be turned on and off by the controller, for example in response to information from a temperature sensor positioned within the vapor conduit or adjacent to the vapor conduit. A thermal control unit can be turned on and off by the controller, for example in tandem with turning on the heating element for the recharge cycle.

The state of the art has progressed to the point where there is little distinction left between hardware, software (e.g., a high-level computer program serving as a hardware specification), and/or firmware implementations of aspects of systems, and that the use of hardware, software, and/or firmware is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software (e.g., a high-level computer program serving as a hardware specification), and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software (e.g., a high-level computer program serving as a hardware specification) implementation; or, yet again alternatively, the implementer may opt for some combination of hardware, software (e.g., a high-level computer program serving as a hardware specification), and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Optical aspects of implementations will typically employ optically-oriented hardware, software (e.g., a high-level computer program serving as a hardware specification), and or firmware.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software (e.g., a high-level computer program serving as a hardware specification) or firmware, or of gate arrays or programmable hardware, such as by performing a reception of or a transmission of one or more instructions in relation to one or more operations described herein. In some variants, an implementation may include special-purpose hardware, software (e.g., a high-level computer program serving as a hardware specification), firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit).

Several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. In addition, information generated by the subject matter described herein are capable of being distributed in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

The various embodiments described herein can be implemented, individually and/or collectively, by various types of electro-mechanical systems having a wide range of electrical components such as hardware, software (e.g., a high-level computer program serving as a hardware specification), firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Examples of electro-mechanical systems include but are not limited to a variety of consumer electronics systems, medical devices, and/or communication/computing systems.

Various aspects described herein can be implemented, individually and/or collectively, by a wide range of hardware, software (e.g., a high-level computer program serving as a hardware specification), firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). The subject matter described herein may be implemented in an analog or digital fashion or some combination thereof.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Aspects of the subject matter described herein are set out in the following numbered clauses:

1. In some embodiments, a medicinal storage container includes: a desiccant unit including one or more external walls, the one or more external walls sealed together to form a gas-impermeable barrier around an interior desiccant region, the one or more external walls including an aperture; a heating element positioned within the interior desiccant region; a controller operably attached to the heating element; a cooling unit including one or more external walls, the one or more external walls sealed together to form a gas-impermeable and liquid-impermeable barrier around an interior evaporative region, the one or more external walls including an aperture; a compressor system including at least one evaporator coil unit positioned within the interior evaporative region of the cooling unit, the compressor system operably connected to the controller; a vapor conduit including a first end and a second end, the vapor conduit attached to an external surface of the one or more external walls surrounding the aperture of the desiccant unit at the first end, the vapor conduit attached to an external surface of the one or more external walls surrounding the aperture of the evaporative cooling unit at the second end, the vapor conduit forming an internal, gas-impermeable passageway between the interior desiccant region of the desiccant unit and the interior evaporative region of the cooling unit; a vapor control unit attached to the vapor conduit, the vapor control unit operably attached to the controller; and a medicinal storage unit including one or more external walls encircling a medicinal storage region, the medicinal storage region including at least one temperature sensor operably connected to the controller.

2. Some embodiments include a medicinal storage container as in paragraph 1, wherein the desiccant unit includes one or more units of a desiccant material within the interior desiccant region.

3. Some embodiments include a medicinal storage container as in paragraph 1, wherein the desiccant unit includes a vapor-sealed chamber including an interior desiccant region in vapor contact with an interior region of the vapor conduit.

4. Some embodiments include a medicinal storage container as in paragraph 1, wherein the desiccant unit includes a one-way valve unit, the one-way valve unit configured to allow gas with a pressure beyond a preset limit to vent externally from the internal desiccant region of the desiccant unit.

5. Some embodiments include a medicinal storage container as in paragraph 1, wherein the desiccant unit includes a gas pressure less than atmospheric pressure within the interior desiccant region.

6. Some embodiments include a medicinal storage container as in paragraph 1, wherein the desiccant unit includes a gas pressure less than 1 torr within the interior desiccant region.

7. Some embodiments include a medicinal storage container as in paragraph 1, wherein the desiccant unit includes a gas pressure less than 0.1 torr within the interior desiccant region.

8. Some embodiments include a medicinal storage container as in paragraph 1, wherein the desiccant unit includes an open-cell metal foam positioned within the interior desiccant region, the open-cell metal foam positioned to distribute gas within the interior desiccant region.

9. Some embodiments include a medicinal storage container as in paragraph 1, wherein the desiccant unit includes one or more pipes positioned within the interior desiccant region, the one or more pipes positioned to distribute gas within the interior desiccant region.

10. Some embodiments include a medicinal storage container as in paragraph 1, wherein the one or more external walls of desiccant unit includes a conductive material.

11. Some embodiments include a medicinal storage container as in paragraph 1, wherein the heating element positioned within the interior desiccant region includes an electric heating element.

12. Some embodiments include a medicinal storage container as in paragraph 1, wherein the heating element positioned within the interior desiccant region includes a heating element in a coiled configuration.

13. Some embodiments include a medicinal storage container as in paragraph 1, wherein the heating element positioned within the interior desiccant region includes one or more thermal conduction elements affixed to the heating element.

14. Some embodiments include a medicinal storage container as in paragraph 1, wherein the controller includes an electronic controller.

15. Some embodiments include a medicinal storage container as in paragraph 1, wherein the controller includes memory.

16. Some embodiments include a medicinal storage container as in paragraph 1, wherein the controller includes circuitry configured to control operation of the heating element in response to signals received from the at least one temperature sensor within the medicinal storage region.

17. Some embodiments include a medicinal storage container as in paragraph 1, wherein the controller includes a look-up table.

18. Some embodiments include a medicinal storage container as in paragraph 1, wherein the controller is operably attached to the heating element and to the at least one temperature sensor with a wire connector.

19. Some embodiments include a medicinal storage container as in paragraph 1, wherein the controller is operably attached to the compressor system.

20. Some embodiments include a medicinal storage container as in paragraph 1, wherein the controller is operably attached to an electrical power source.

21. Some embodiments include a medicinal storage container as in paragraph 1, wherein the cooling unit includes: an upper region, the upper region positioned adjacent to the aperture in the exterior wall; a lower region, the lower region positioned below the upper region; and an evaporative liquid positioned substantially within the lower region.

22. Some embodiments include a medicinal storage container as in paragraph 1, wherein the cooling unit includes at least one evaporative liquid within the interior evaporative region of the evaporative cooling unit.

23. Some embodiments include a medicinal storage container as in paragraph 1, wherein the cooling unit includes a liquid retaining unit connected to at least one surface adjacent to the interior evaporative region.

24. Some embodiments include a medicinal storage container as in paragraph 1, wherein the cooling unit includes one or more thermal conduction elements affixed to the at least one evaporator coil unit positioned within the interior evaporative region.

25. Some embodiments include a medicinal storage container as in paragraph 1, wherein the cooling unit includes one or more temperature sensors within the interior evaporative region, the one or more temperature sensors operably attached to the controller.

26. Some embodiments include a medicinal storage container as in paragraph 1, wherein the cooling unit includes a liquid level sensor positioned within the interior evaporative region.

27. Some embodiments include a medicinal storage container as in paragraph 1, wherein the at least one evaporator coil unit positioned within the interior evaporative region of the cooling unit is positioned adjacent to the exterior wall of the cooling unit that is proximal to the desiccant unit.

28. Some embodiments include a medicinal storage container as in paragraph 1, wherein the at least one evaporator coil unit positioned within the interior evaporative region of the cooling unit is positioned substantially in the center of the cooling unit.

29. Some embodiments include a medicinal storage container as in paragraph 1, wherein the at least one evaporator coil unit positioned within the interior evaporative region of the cooling unit is positioned adjacent to the exterior wall of the cooling unit that is proximal to the medicinal storage unit.

30. Some embodiments include a medicinal storage container as in paragraph 1, wherein the compressor system includes: at least one evaporator coil unit positioned within the interior evaporative region of the cooling unit; a compressor unit; a condenser unit; and an expansion valve; wherein the compressor unit, the condenser unit, and the expansion valve are positioned exterior to the interior evaporative region of the cooling unit.

31. Some embodiments include a medicinal storage container as in paragraph 1, wherein the compressor system includes a switch configured to turn the compressor system on and off in response to a signal received from the controller.

32. Some embodiments include a medicinal storage container as in paragraph 1, wherein the vapor conduit includes a substantially tubular structure of sufficient length and diameter to inhibit thermal conduction between the at least one external wall of the desiccant unit and the at least one external wall of the cooling unit.

33. Some embodiments include a medicinal storage container as in paragraph 1, wherein the vapor conduit is configured to minimize conduction of thermal energy between the desiccant unit and the cooling unit.

34. Some embodiments include a medicinal storage container as in paragraph 1, wherein the vapor conduit includes: one or more thermal conduction elements affixed to an external surface of the vapor conduit.

35. Some embodiments include a medicinal storage container as in paragraph 1, wherein the vapor conduit includes: a gas-impermeable wall of the vapor conduit; a gas-impermeable seal between the first end of the vapor conduit and the desiccant unit; and a gas-impermeable seal between the second end of the vapor conduit and the cooling unit.

36. Some embodiments include a medicinal storage container as in paragraph 1, wherein the vapor conduit includes an externally-breakable seal across the internal passageway of the vapor conduit, the seal configured to prevent the flow of gas through the internal passageway of the vapor conduit.

37. Some embodiments include a medicinal storage container as in paragraph 1, wherein the vapor conduit includes: a first temperature sensor positioned adjacent to the first end within the vapor conduit, the first temperature sensor operably attached to the controller; and a second temperature sensor positioned adjacent to the second end within the vapor conduit, the second temperature sensor operably attached to the controller.

38. Some embodiments include a medicinal storage container as in paragraph 1, wherein the vapor control unit includes at least one valve configured to control movement of gas through the internal passageway of the vapor conduit between the interior desiccant region of the desiccant unit and the interior evaporative region of the cooling unit, the at least one valve configured to operate in response to signals received from the controller.

39. Some embodiments include a medicinal storage container as in paragraph 1, wherein the vapor control unit includes a temperature sensor.

40. Some embodiments include a medicinal storage container as in paragraph 1, wherein the vapor control unit includes a pressure sensor.

41. Some embodiments include a medicinal storage container as in paragraph 1, wherein the medicinal storage unit includes one or more walls adjacent to the medicinal storage region, the one or more walls fabricated to be thermally-conductive at expected temperatures of the medicinal storage region.

42. Some embodiments include a medicinal storage container as in paragraph 1, wherein the medicinal storage unit includes a hinged lid positioned in the external walls adjacent to a top region of the medicinal storage region, the hinged lid configured to allow access to the medicinal storage region by a user.

43. Some embodiments include a medicinal storage container as in paragraph 1, wherein the at least one temperature sensor of the medicinal storage unit is positioned to detect temperature within the medicinal storage region.

44. Some embodiments include a medicinal storage container as in paragraph 1, wherein the at least one temperature sensor of the medicinal storage unit is an electronic temperature sensor.

45. Some embodiments include a medicinal storage container as in paragraph 1, further including one or more segments of insulation surrounding the cooling unit and the medicinal storage unit.

46. Some embodiments include a medicinal storage container as in paragraph 1, further including a base unit positioned beneath the medicinal storage container, the base unit including one or more walls substantially surrounding at least a region of the compressor system and the controller.

47. Some embodiments include a medicinal storage container as in paragraph 1, further including a gap positioned between an exterior surface of the one or more external walls of the desiccant unit and an exterior surface of the one or more external walls of the cooling unit.

48. Some embodiments include a medicinal storage container as in paragraph 1, further including a gap positioned between an exterior surface of the one or more external walls of the desiccant unit and an exterior surface of the one or more external walls of the cooling unit; and a fan affixed to the exterior surface of the one or more external walls of the desiccant unit, the fan of a size, shape and position to circulate air within the gap.

49. In some embodiments, a medicinal storage container includes: a desiccant unit including one or more external walls, the one or more external walls sealed together to form a gas-impermeable barrier around an interior desiccant region, the one or more external walls including an aperture; a heating element positioned within the interior desiccant region; a controller operably attached to the heating element; a cooling unit including one or more external walls, the one or more external walls sealed together to form a gas-impermeable and liquid-impermeable barrier around an interior evaporative region, the one or more external walls including an aperture; a compressor system including at least one evaporator coil unit positioned within the interior evaporative region of the cooling unit, the compressor system operably connected to the controller; a freezer unit including one or more walls, the freezer unit in thermal contact with the at least one evaporator coil unit positioned within the interior evaporative region of the cooling unit; a vapor conduit including a first end and a second end, the vapor conduit attached to an external surface of the one or more external walls surrounding the aperture of the desiccant unit at the second end, the vapor conduit attached to an external surface of the one or more external walls surrounding the aperture of the evaporative cooling unit at the first end, the vapor conduit forming an internal, gas-impermeable passageway between the interior desiccant region of the desiccant unit and the interior evaporative region of the cooling unit; a vapor control unit attached to the vapor conduit, the vapor control unit operably attached to the controller; and a medicinal storage unit including one or more external walls encircling a medicinal storage region, the medicinal storage region including at least one temperature sensor operably connected to the controller.

50. Some embodiments include a medicinal storage container as in paragraph 49, wherein the desiccant unit includes one or more units of a desiccant material within the interior desiccant region.

51. Some embodiments include a medicinal storage container as in paragraph 49, wherein the desiccant unit includes a vapor-sealed chamber including an interior desiccant region in vapor contact with an interior region of the vapor conduit.

52. Some embodiments include a medicinal storage container as in paragraph 49, wherein the desiccant unit includes a one-way valve unit, the one-way valve unit configured to allow gas with a pressure beyond a preset limit to vent externally from the internal desiccant region of the desiccant unit.

53. Some embodiments include a medicinal storage container as in paragraph 49, wherein the desiccant unit includes a gas pressure less than atmospheric pressure within the interior desiccant region.

54. Some embodiments include a medicinal storage container as in paragraph 49, wherein the desiccant unit includes a gas pressure less than 1 torr within the interior desiccant region.

55. Some embodiments include a medicinal storage container as in paragraph 49, wherein the desiccant unit includes a gas pressure less than 0.1 torr within the interior desiccant region.

56. Some embodiments include a medicinal storage container as in paragraph 49, wherein the desiccant unit includes an open-cell metal foam positioned within the interior desiccant region, the open-cell metal foam positioned to distribute gas within the interior desiccant region.

57. Some embodiments include a medicinal storage container as in paragraph 49, wherein the desiccant unit includes one or more pipes positioned within the interior desiccant region, the one or more pipes positioned to distribute gas within the interior desiccant region.

58. Some embodiments include a medicinal storage container as in paragraph 49, wherein the one or more external walls of the desiccant unit includes a conductive material.

59. Some embodiments include a medicinal storage container as in paragraph 49, wherein the heating element positioned within the interior desiccant region includes an electric heating element.

60. Some embodiments include a medicinal storage container as in paragraph 49, wherein the heating element positioned within the interior desiccant region includes a heating element in a coiled configuration.

61. Some embodiments include a medicinal storage container as in paragraph 49, wherein the heating element positioned within the interior desiccant region includes one or more thermal conduction elements affixed to the heating element.

62. Some embodiments include a medicinal storage container as in paragraph 49, wherein the controller includes an electronic controller.

63. Some embodiments include a medicinal storage container as in paragraph 49, wherein the controller includes memory.

64. Some embodiments include a medicinal storage container as in paragraph 49, wherein the controller includes circuitry configured to control operation of the heating element in response to signals received from the at least one temperature sensor within the medicinal storage region.

65. Some embodiments include a medicinal storage container as in paragraph 49, wherein the controller includes a look-up table.

66. Some embodiments include a medicinal storage container as in paragraph 49, wherein the controller is operably attached to the heating element and to the at least one temperature sensor with a wire connector.

67. Some embodiments include a medicinal storage container as in paragraph 49, wherein the controller is operably attached to the compressor system.

68. Some embodiments include a medicinal storage container as in paragraph 49, wherein the controller is operably attached to an electrical power source.

69. Some embodiments include a medicinal storage container as in paragraph 49, wherein the cooling unit includes: an upper region, the upper region positioned adjacent to the aperture in the exterior wall; a lower region, the lower region positioned below the upper region; and an evaporative liquid positioned substantially within the lower region.

70. Some embodiments include a medicinal storage container as in paragraph 49, wherein the cooling unit includes at least one evaporative liquid within the interior evaporative region of the evaporative cooling unit.

71. Some embodiments include a medicinal storage container as in paragraph 49, wherein the cooling unit includes a liquid retaining unit connected to at least one surface adjacent to the interior evaporative region.

72. Some embodiments include a medicinal storage container as in paragraph 49, wherein the cooling unit includes one or more thermal conduction elements affixed to the at least one evaporator coil unit positioned within the interior evaporative region.

73. Some embodiments include a medicinal storage container as in paragraph 49, wherein the cooling unit includes one or more temperature sensors within the interior evaporative region, the one or more temperature sensors operably attached to the controller.

74. Some embodiments include a medicinal storage container as in paragraph 49, wherein the cooling unit includes a liquid level sensor positioned within the interior evaporative region.

75. Some embodiments include a medicinal storage container as in paragraph 49, wherein the at least one evaporator coil unit positioned within the interior evaporative region of the cooling unit is positioned adjacent to one or more walls of the freezer unit.

76. Some embodiments include a medicinal storage container as in paragraph 49, wherein the compressor system includes: at least one evaporator coil unit positioned within the interior evaporative region of the cooling unit; a compressor unit; a condenser unit; and an expansion valve; wherein the compressor unit, the condenser unit, and the expansion valve are positioned exterior to the interior evaporative region of the cooling unit.

77. Some embodiments include a medicinal storage container as in paragraph 49, wherein the compressor system includes a switch configured to turn the compressor system on and off in response to a signal received from the controller.

78. Some embodiments include a medicinal storage container as in paragraph 49, wherein the freezer unit includes one or more walls of a size, shape and position to hold one or more ice packs in position.

79. Some embodiments include a medicinal storage container as in paragraph 49, wherein the freezer unit includes: an aperture of a size, shape and position for a user to access material within the freezer unit; and a cover reversibly affixed to the aperture.

80. Some embodiments include a medicinal storage container as in paragraph 49, wherein the freezer unit includes a temperature sensor operably attached to the controller.

81. Some embodiments include a medicinal storage container as in paragraph 49, wherein the freezer unit includes a thermally-conductive wall with a first side positioned adjacent to an internal freezer region, and a second side positioned in thermal contact with an exterior surface of the at least one evaporator coil unit.

82. Some embodiments include a medicinal storage container as in paragraph 49, wherein the vapor conduit includes a substantially tubular structure of sufficient length and diameter to inhibit thermal conduction between the at least one external wall of the desiccant unit and the at least one external wall of the cooling unit.

83. Some embodiments include a medicinal storage container as in paragraph 49, wherein the vapor conduit is configured to minimize conduction of thermal energy between the desiccant unit and the cooling unit.

84. Some embodiments include a medicinal storage container as in paragraph 49, wherein the vapor conduit c includes one or more thermal conduction elements affixed to an external surface of the vapor conduit.

85. Some embodiments include a medicinal storage container as in paragraph 49, wherein the vapor conduit includes: a gas-impermeable wall of the vapor conduit; a gas-impermeable seal between the first end of the vapor conduit and the desiccant unit; and a gas-impermeable seal between the second end of the vapor conduit and the cooling unit.

86. Some embodiments include a medicinal storage container as in paragraph 49, wherein the vapor conduit includes an externally-breakable seal across the internal passageway of the vapor conduit, the seal configured to prevent the flow of gas through the internal passageway of the vapor conduit.

87. Some embodiments include a medicinal storage container as in paragraph 49, wherein the vapor conduit includes: a first temperature sensor positioned adjacent to the first end within the vapor conduit, the first temperature sensor operably attached to the controller; and a second temperature sensor positioned adjacent to the second end within the vapor conduit, the second temperature sensor operably attached to the controller.

88. Some embodiments include a medicinal storage container as in paragraph 49, wherein the vapor control unit includes at least one valve configured to control movement of gas through the internal passageway of the vapor conduit between the interior desiccant region of the desiccant unit and the interior evaporative region of the cooling unit, the at least one valve configured to operate in response to signals received from the controller.

89. Some embodiments include a medicinal storage container as in paragraph 49, wherein the vapor control unit includes a temperature sensor.

90. Some embodiments include a medicinal storage container as in paragraph 49, wherein the vapor control unit includes a pressure sensor.

91. Some embodiments include a medicinal storage container as in paragraph 49, wherein the medicinal storage unit includes one or more walls adjacent to the medicinal storage region, the one or more walls fabricated to be thermally-conductive at expected temperatures of the medicinal storage region.

92. Some embodiments include a medicinal storage container as in paragraph 49, wherein the medicinal storage unit includes a hinged lid positioned in the external walls adjacent to a top region of the medicinal storage region, the hinged lid configured to allow access to the medicinal storage region by a user.

93. Some embodiments include a medicinal storage container as in paragraph 49, wherein the at least one temperature sensor of the medicinal storage unit is positioned to detect temperature within the medicinal storage region.

94. Some embodiments include a medicinal storage container as in paragraph 49, wherein the at least one temperature sensor of the medicinal storage unit is an electronic temperature sensor.

95. Some embodiments include a medicinal storage container as in paragraph 49, further including one or more segments of insulation surrounding the cooling unit, the medicinal storage unit and the freezer unit.

96. Some embodiments include a medicinal storage container as in paragraph 49, further including a base unit positioned beneath the medicinal storage container, the base unit including one or more walls substantially surrounding at least a region of the compressor system and the controller.

97. Some embodiments include a medicinal storage container as in paragraph 49, further including a gap positioned between an exterior surface of the one or more external walls of the desiccant unit and an exterior surface of the one or more external walls of the cooling unit.

98. Some embodiments include a medicinal storage container as in paragraph 49, further including: a gap positioned between an exterior surface of the one or more external walls of the desiccant unit and an exterior surface of the one or more external walls of the cooling unit; and a fan affixed to the exterior surface of the one or more external walls of the desiccant unit, the fan of a size, shape and position to circulate air within the gap.

99. In some embodiments, a medicinal storage container includes: a desiccant unit including one or more external walls, the one or more external walls sealed together to form a gas-impermeable barrier around an interior desiccant region, the one or more external walls including an aperture; a heating element positioned within the interior desiccant region; a controller operably attached to the heating element; a cooling unit including one or more external walls, the one or more external walls sealed together to form a gas-impermeable and liquid-impermeable barrier around an interior evaporative region, the one or more external walls including an aperture; a compressor system including at least one evaporator coil unit positioned within the interior evaporative region of the cooling unit, the compressor system operably connected to the controller; a vapor conduit including a first end and a second end, the vapor conduit attached to an external surface of the one or more external walls surrounding the aperture of the desiccant unit at the second end, the vapor conduit attached to an external surface of the one or more external walls surrounding the aperture of the evaporative cooling unit at the first end, the vapor conduit forming an internal, gas-impermeable passageway between the interior desiccant region of the desiccant unit and the interior evaporative region of the cooling unit; a vapor control unit attached to the vapor conduit, the vapor control unit operably attached to the controller; a thermal control unit attached to the vapor conduit, the thermal control unit operably attached to the controller; and a medicinal storage unit including one or more external walls encircling a medicinal storage region, the medicinal storage region including at least one temperature sensor operably connected to the controller.

100. Some embodiments include a medicinal storage container as in paragraph 99, wherein the desiccant unit includes one or more units of a desiccant material within the interior desiccant region.

101. Some embodiments include a medicinal storage container as in paragraph 99, wherein the desiccant unit includes a vapor-sealed chamber including an interior desiccant region in vapor contact with an interior region of the vapor conduit.

102. Some embodiments include a medicinal storage container as in paragraph 99, wherein the desiccant unit includes a one-way valve unit, the one-way valve unit configured allow gas with a pressure beyond a preset limit to vent externally from the internal desiccant region of the desiccant unit.

103. Some embodiments include a medicinal storage container as in paragraph 99, wherein the desiccant unit includes a gas pressure less than atmospheric pressure within the interior desiccant region.

104. Some embodiments include a medicinal storage container as in paragraph 99, wherein the desiccant unit includes a gas pressure less than 1 torr within the interior desiccant region.

105. Some embodiments include a medicinal storage container as in paragraph 99, wherein the desiccant unit includes a gas pressure less than 0.1 torr within the interior desiccant region.

106. Some embodiments include a medicinal storage container as in paragraph 99, wherein the desiccant unit includes an open-cell metal foam positioned within the interior desiccant region, the open-cell metal foam positioned to distribute gas within the interior desiccant region.

107. Some embodiments include a medicinal storage container as in paragraph 99, wherein the desiccant unit includes one or more pipes positioned within the interior desiccant region, the one or more pipes positioned to distribute gas within the interior desiccant region.

108. Some embodiments include a medicinal storage container as in paragraph 99, wherein the one or more external walls of desiccant unit includes a conductive material.

109. Some embodiments include a medicinal storage container as in paragraph 99, wherein the heating element positioned within the interior desiccant region includes an electric heating element.

110. Some embodiments include a medicinal storage container as in paragraph 99, wherein the heating element positioned within the interior desiccant region includes a heating element in a coiled configuration.

111. Some embodiments include a medicinal storage container as in paragraph 99, wherein the heating element positioned within the interior desiccant region includes one or more thermal conduction elements affixed to the heating element.

112. Some embodiments include a medicinal storage container as in paragraph 99, wherein the controller includes an electronic controller.

113. Some embodiments include a medicinal storage container as in paragraph 99, wherein the controller includes memory.

114. Some embodiments include a medicinal storage container as in paragraph 99, wherein the controller includes circuitry configured to control operation of the heating element in response to signals received from the at least one temperature sensor within the medicinal storage region.

115. Some embodiments include a medicinal storage container as in paragraph 99, wherein the controller includes a look-up table.

116. Some embodiments include a medicinal storage container as in paragraph 99, wherein the controller is operably attached to the heating element and to the at least one temperature sensor with a wire connector.

117. Some embodiments include a medicinal storage container as in paragraph 99, wherein the controller is operably attached to the compressor system.

118. Some embodiments include a medicinal storage container as in paragraph 99, wherein the controller is operably attached to an electrical power source.

119. Some embodiments include a medicinal storage container as in paragraph 99, wherein the cooling unit includes: an upper region, the upper region positioned adjacent to the aperture in the exterior wall; a lower region, the lower region positioned below the upper region; and an evaporative liquid positioned substantially within the lower region.

120. Some embodiments include a medicinal storage container as in paragraph 99, wherein the cooling unit includes at least one evaporative liquid within the interior evaporative region of the evaporative cooling unit.

121. Some embodiments include a medicinal storage container as in paragraph 99, wherein the cooling unit includes a liquid retaining unit connected to at least one surface adjacent to the interior evaporative region.

122. Some embodiments include a medicinal storage container as in paragraph 99, wherein the cooling unit includes one or more thermal conduction elements affixed to the at least one evaporator coil unit positioned within the interior evaporative region.

123. Some embodiments include a medicinal storage container as in paragraph 99, wherein the cooling unit includes one or more temperature sensors within the interior evaporative region, the one or more temperature sensors operably attached to the controller.

124. Some embodiments include a medicinal storage container as in paragraph 99, wherein the cooling unit includes a liquid level sensor positioned within the interior evaporative region.

125. Some embodiments include a medicinal storage container as in paragraph 99, wherein the at least one evaporator coil unit positioned within the interior evaporative region of the cooling unit is positioned adjacent to the exterior wall of the cooling unit that is proximal to the desiccant unit.

126. Some embodiments include a medicinal storage container as in paragraph 99, wherein the at least one evaporator coil unit positioned within the interior evaporative region of the cooling unit is positioned substantially in the center of the cooling unit.

127. Some embodiments include a medicinal storage container as in paragraph 99, wherein the at least one evaporator coil unit positioned within the interior evaporative region of the cooling unit is positioned adjacent to the exterior wall of the cooling unit that is proximal to the medicinal storage unit.

128. Some embodiments include a medicinal storage container as in paragraph 99, wherein the compressor system includes: at least one evaporator coil unit positioned within the interior evaporative region of the cooling unit; a compressor unit; a condenser unit; and an expansion valve; wherein the compressor unit, the condenser unit, and the expansion valve are positioned exterior to the interior evaporative region of the cooling unit.

129. Some embodiments include a medicinal storage container as in paragraph 99, wherein the compressor system includes a switch configured to turn the compressor system on and off in response to a signal received from the controller.

130. Some embodiments include a medicinal storage container as in paragraph 99, wherein the vapor conduit includes a substantially tubular structure of sufficient length and diameter to inhibit thermal conduction between the at least one external wall of the desiccant unit and the at least one external wall of the cooling unit.

131. Some embodiments include a medicinal storage container as in paragraph 99, wherein the vapor conduit is configured to minimize conduction of thermal energy between the desiccant unit and the cooling unit.

132. Some embodiments include a medicinal storage container as in paragraph 99, wherein the vapor conduit includes one or more thermal conduction elements affixed to an external surface of the vapor conduit.

133. Some embodiments include a medicinal storage container as in paragraph 99, wherein the vapor conduit includes: a gas-impermeable wall of the vapor conduit; a gas-impermeable seal between the first end of the vapor conduit and the desiccant unit; and a gas-impermeable seal between the second end of the vapor conduit and the cooling unit.

134. Some embodiments include a medicinal storage container as in paragraph 99, wherein the vapor conduit includes an externally-breakable seal across the internal passageway of the vapor conduit, the seal configured to prevent the flow of gas through the internal passageway of the vapor conduit.

135. Some embodiments include a medicinal storage container as in paragraph 99, wherein the vapor conduit includes: a first temperature sensor positioned adjacent to the first end within the vapor conduit, the first temperature sensor operably attached to the controller; and a second temperature sensor positioned adjacent to the second end within the vapor conduit, the second temperature sensor operably attached to the controller.

136. Some embodiments include a medicinal storage container as in paragraph 99, wherein the vapor control unit includes at least one valve configured to control movement of gas through the internal passageway of the vapor conduit between the interior desiccant region of the desiccant unit and the interior evaporative region of the cooling unit, the at least one valve configured to operate in response to signals received from the controller.

137. Some embodiments include a medicinal storage container as in paragraph 99, wherein the vapor control unit includes a temperature sensor.

138. Some embodiments include a medicinal storage container as in paragraph 99, wherein the vapor control unit includes a pressure sensor.

139. Some embodiments include a medicinal storage container as in paragraph 99, wherein the thermal control unit includes a peltier device positioned with a cooling surface adjacent to an external surface of the vapor conduit.

140. Some embodiments include a medicinal storage container as in paragraph 99, wherein the thermal control unit includes an evaporator coil unit in thermal contact with the vapor conduit, the evaporator coil unit attached to the compressor system.

141. Some embodiments include a medicinal storage container as in paragraph 99, wherein the medicinal storage unit includes one or more walls adjacent to the medicinal storage region, the one or more walls fabricated to be thermally-conductive at expected temperatures of the medicinal storage region.

142. Some embodiments include a medicinal storage container as in paragraph 99, wherein the medicinal storage unit includes a hinged lid positioned in the external walls adjacent to a top region of the medicinal storage region, the hinged lid configured to allow access to the medicinal storage region by a user.

143. Some embodiments include a medicinal storage container as in paragraph 99, wherein the at least one temperature sensor of the medicinal storage unit is positioned to detect temperature within the medicinal storage region.

144. Some embodiments include a medicinal storage container as in paragraph 99, wherein the at least one temperature sensor of the medicinal storage unit is an electronic temperature sensor.

145. Some embodiments include a medicinal storage container as in paragraph 99, further including one or more segments of insulation surrounding the cooling unit and the medicinal storage unit.

146. Some embodiments include a medicinal storage container as in paragraph 99, further including a base unit positioned beneath the medicinal storage container, the base unit including one or more walls substantially surrounding at least a region of the compressor system and the controller.

147. Some embodiments include a medicinal storage container as in paragraph 99, further including a gap positioned between an exterior surface of the one or more external walls of the desiccant unit and an exterior surface of the one or more external walls of the cooling unit.

148. Some embodiments include a medicinal storage container as in paragraph 99, further including: a gap positioned between an exterior surface of the one or more external walls of the desiccant unit and an exterior surface of the one or more external walls of the cooling unit; and a fan affixed to the exterior surface of the one or more external walls of the desiccant unit, the fan of a size, shape and position to circulate air within the gap.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. A medicinal storage container, comprising:
 a desiccant unit including one or more external walls, the one or more external walls sealed together to form a gas-impermeable barrier around an interior desiccant region, the one or more external walls including an aperture;
 a heating element positioned within the interior desiccant region;
 a controller operably attached to the heating element;

a cooling unit including one or more external walls, the one or more external walls sealed together to form a gas-impermeable and liquid-impermeable barrier around an interior evaporative region, the one or more external walls including an aperture;

a compressor system including at least one evaporator coil unit positioned within the interior evaporative region of the cooling unit, the compressor system operably connected to the controller;

a vapor conduit including a first end and a second end, the vapor conduit attached to an external surface of the one or more external walls surrounding the aperture of the desiccant unit at the first end, the vapor conduit attached to an external surface of the one or more external walls surrounding the aperture of the evaporative cooling unit at the second end, the vapor conduit forming an internal, gas-impermeable passageway between the interior desiccant region of the desiccant unit and the interior evaporative region of the cooling unit;

a vapor control unit attached to the vapor conduit, the vapor control unit operably attached to the controller; and a medicinal storage unit including one or more external walls encircling a medicinal storage region, the medicinal storage region including at least one temperature sensor operably connected to the controller.

2. The medicinal storage container of claim 1, wherein the desiccant unit comprises:
a gas pressure less than atmospheric pressure within the interior desiccant region.

3. The medicinal storage container of claim 1, wherein the cooling unit comprises:
an upper region, the upper region positioned adjacent to the aperture in the exterior wall;
a lower region, the lower region positioned below the upper region; and
an evaporative liquid positioned substantially within the lower region.

4. The medicinal storage container of claim 1, wherein the cooling unit comprises:
a liquid retaining unit connected to at least one surface adjacent to the interior evaporative region.

5. The medicinal storage container of claim 1, wherein the cooling unit comprises:
one or more temperature sensors within the interior evaporative region, the one or more temperature sensors operably attached to the controller.

6. The medicinal storage container of claim 1, wherein the cooling unit comprises:
a liquid level sensor positioned within the interior evaporative region.

7. The medicinal storage container of claim 1, wherein the at least one evaporator coil unit positioned within the interior evaporative region of the cooling unit is positioned adjacent to the exterior wall of the cooling unit that is proximal to the desiccant unit.

8. The medicinal storage container of claim 1, wherein the at least one evaporator coil unit positioned within the interior evaporative region of the cooling unit is positioned substantially in the center of the cooling unit.

9. The medicinal storage container of claim 1, wherein the compressor system comprises:
a switch configured to turn the compressor system on and off in response to a signal received from the controller.

10. The medicinal storage container of claim 1, wherein the vapor conduit comprises:

a gas-impermeable wall of the vapor conduit;
a gas-impermeable seal between the first end of the vapor conduit and the desiccant unit; and
a gas-impermeable seal between the second end of the vapor conduit and the cooling unit.

11. The medicinal storage container of claim 1, wherein the vapor conduit comprises:
an externally-breakable seal across the internal passageway of the vapor conduit, the seal configured to prevent the flow of gas through the internal passageway of the vapor conduit.

12. The medicinal storage container of claim 1, wherein the vapor conduit comprises:
a first temperature sensor positioned adjacent to the first end within the vapor conduit, the first temperature sensor operably attached to the controller; and
a second temperature sensor positioned adjacent to the second end within the vapor conduit, the second temperature sensor operably attached to the controller.

13. The medicinal storage container of claim 1, further comprising:
one or more segments of insulation surrounding the cooling unit and the medicinal storage unit.

14. The medicinal storage container of claim 1, further comprising:
a gap positioned between an exterior surface of the one or more external walls of the desiccant unit and an exterior surface of the one or more external walls of the cooling unit.

15. A medicinal storage container, comprising:
a desiccant unit including one or more external walls, the one or more external walls sealed together to form a gas-impermeable barrier around an interior desiccant region, the one or more external walls including an aperture;
a heating element positioned within the interior desiccant region;
a controller operably attached to the heating element;
a cooling unit including one or more external walls, the one or more external walls sealed together to form a gas-impermeable and liquid-impermeable barrier around an interior evaporative region, the one or more external walls including an aperture;
a compressor system including at least one evaporator coil unit positioned within the interior evaporative region of the cooling unit, the compressor system operably connected to the controller;
a freezer unit including one or more walls, the freezer unit in thermal contact with the at least one evaporator coil unit positioned within the interior evaporative region of the cooling unit;
a vapor conduit including a first end and a second end, the vapor conduit attached to an external surface of the one or more external walls surrounding the aperture of the desiccant unit at the second end, the vapor conduit attached to an external surface of the one or more external walls surrounding the aperture of the evaporative cooling unit at the first end, the vapor conduit forming an internal, gas-impermeable passageway between the interior desiccant region of the desiccant unit and the interior evaporative region of the cooling unit;
a vapor control unit attached to the vapor conduit, the vapor control unit operably attached to the controller; and
a medicinal storage unit including one or more external walls encircling a medicinal storage region, the medicinal storage region including at least one temperature sensor operably connected to the controller.

16. The medicinal storage container of claim 15, wherein the desiccant unit comprises:
a gas pressure less than atmospheric pressure within the interior desiccant region.

17. The medicinal storage container of claim 15, wherein the cooling unit comprises:
an upper region, the upper region positioned adjacent to the aperture in the exterior wall;
a lower region, the lower region positioned below the upper region; and
an evaporative liquid positioned substantially within the lower region.

18. The medicinal storage container of claim 15, wherein the cooling unit comprises:
a liquid retaining unit connected to at least one surface adjacent to the interior evaporative region.

19. The medicinal storage container of claim 15, wherein the cooling unit comprises:
one or more temperature sensors within the interior evaporative region, the one or more temperature sensors operably attached to the controller.

20. The medicinal storage container of claim 15, wherein the cooling unit comprises:
a liquid level sensor positioned within the interior evaporative region.

21. The medicinal storage container of claim 15, wherein the compressor system comprises:
at least one evaporator coil unit positioned within the interior evaporative region of the cooling unit;
a compressor unit;
a condenser unit; and
an expansion valve;
wherein the compressor unit, the condenser unit, and the expansion valve are positioned exterior to the interior evaporative region of the cooling unit.

22. The medicinal storage container of claim 15, wherein the compressor system comprises:
a switch configured to turn the compressor system on and off in response to a signal received from the controller.

23. The medicinal storage container of claim 15, wherein the freezer unit comprises:
a temperature sensor operably attached to the controller.

24. The medicinal storage container of claim 15, wherein the freezer unit comprises:
a thermally-conductive wall with a first side positioned adjacent to an internal freezer region, and a second side positioned in thermal contact with an exterior surface of the at least one evaporator coil unit.

25. The medicinal storage container of claim 15, wherein the vapor conduit comprises:
a gas-impermeable wall of the vapor conduit;
a gas-impermeable seal between the first end of the vapor conduit and the desiccant unit; and
a gas-impermeable seal between the second end of the vapor conduit and the cooling unit.

26. The medicinal storage container of claim 15, wherein the vapor conduit comprises:
an externally-breakable seal across the internal passageway of the vapor conduit, the seal configured to prevent the flow of gas through the internal passageway of the vapor conduit.

27. The medicinal storage container of claim 15, wherein the vapor conduit comprises:

a first temperature sensor positioned adjacent to the first end within the vapor conduit, the first temperature sensor operably attached to the controller; and
a second temperature sensor positioned adjacent to the second end within the vapor conduit, the second temperature sensor operably attached to the controller.

28. The medicinal storage container of claim 15, further comprising:
one or more segments of insulation surrounding the cooling unit, the medicinal storage unit and the freezer unit.

29. The medicinal storage container of claim 15, further comprising:
a gap positioned between an exterior surface of the one or more external walls of the desiccant unit and an exterior surface of the one or more external walls of the cooling unit.

30. A medicinal storage container, comprising:
a desiccant unit including one or more external walls, the one or more external walls sealed together to form a gas-impermeable barrier around an interior desiccant region, the one or more external walls including an aperture;
a heating element positioned within the interior desiccant region;
a controller operably attached to the heating element;
a cooling unit including one or more external walls, the one or more external walls sealed together to form a gas-impermeable and liquid-impermeable barrier around an interior evaporative region, the one or more external walls including an aperture;
a compressor system including at least one evaporator coil unit positioned within the interior evaporative region of the cooling unit, the compressor system operably connected to the controller;
a vapor conduit including a first end and a second end, the vapor conduit attached to an external surface of the one or more external walls surrounding the aperture of the desiccant unit at the second end, the vapor conduit attached to an external surface of the one or more external walls surrounding the aperture of the evaporative cooling unit at the first end, the vapor conduit forming an internal, gas-impermeable passageway between the interior desiccant region of the desiccant unit and the interior evaporative region of the cooling unit;
a vapor control unit attached to the vapor conduit, the vapor control unit operably attached to the controller;
a thermal control unit attached to the vapor conduit, the thermal control unit operably attached to the controller; and
a medicinal storage unit including one or more external walls encircling a medicinal storage region, the medicinal storage region including at least one temperature sensor operably connected to the controller.

31. The medicinal storage container of claim 30, wherein the desiccant unit comprises:
a gas pressure less than atmospheric pressure within the interior desiccant region.

32. The medicinal storage container of claim 30, wherein the cooling unit comprises:
an upper region, the upper region positioned adjacent to the aperture in the exterior wall;
a lower region, the lower region positioned below the upper region; and
an evaporative liquid positioned substantially within the lower region.

33. The medicinal storage container of claim 30, wherein the cooling unit comprises:
   a liquid retaining unit connected to at least one surface adjacent to the interior evaporative region.

34. The medicinal storage container of claim 30, wherein the cooling unit comprises:
   one or more temperature sensors within the interior evaporative region, the one or more temperature sensors operably attached to the controller.

35. The medicinal storage container of claim 30, wherein the cooling unit comprises:
   a liquid level sensor positioned within the interior evaporative region.

36. The medicinal storage container of claim 30, wherein the compressor system comprises:
   at least one evaporator coil unit positioned within the interior evaporative region of the cooling unit;
   a compressor unit;
   a condenser unit; and
   an expansion valve;
   wherein the compressor unit, the condenser unit, and the expansion valve are positioned exterior to the interior evaporative region of the cooling unit.

37. The medicinal storage container of claim 30, wherein the compressor system comprises:
   a switch configured to turn the compressor system on and off in response to a signal received from the controller.

38. The medicinal storage container of claim 30, wherein the vapor conduit comprises:
   a gas-impermeable wall of the vapor conduit;
   a gas-impermeable seal between the first end of the vapor conduit and the desiccant unit; and
   a gas-impermeable seal between the second end of the vapor conduit and the cooling unit.

39. The medicinal storage container of claim 30, wherein the vapor conduit comprises:
   an externally-breakable seal across the internal passageway of the vapor conduit, the seal configured to prevent the flow of gas through the internal passageway of the vapor conduit.

40. The medicinal storage container of claim 30, wherein the vapor conduit comprises:
   a first temperature sensor positioned adjacent to the first end within the vapor conduit, the first temperature sensor operably attached to the controller; and
   a second temperature sensor positioned adjacent to the second end within the vapor conduit, the second temperature sensor operably attached to the controller.

41. The medicinal storage container of claim 30, wherein the thermal control unit comprises:
   a peltier device positioned with a cooling surface adjacent to an external surface of the vapor conduit.

42. The medicinal storage container of claim 30, wherein the thermal control unit comprises:
   an evaporator coil unit in thermal contact with the vapor conduit, the evaporator coil unit attached to the compressor system.

43. The medicinal storage container of claim 30, further comprising:
   a gap positioned between an exterior surface of the one or more external walls of the desiccant unit and an exterior surface of the one or more external walls of the cooling unit.

* * * * *

UNITED STATES PATENT AND TRADEMARK OFFICE
CERTIFICATE OF CORRECTION

PATENT NO. : 9,657,982 B2  
APPLICATION NO. : 14/454899  
DATED : May 23, 2017  
INVENTOR(S) : Fong-Li Chou et al.

Page 1 of 1

It is certified that error appears in the above-identified patent and that said Letters Patent is hereby corrected as shown below:

Column 1, Line 33:
"filed 29 Mar. 2013,"
Should read:
--filed 29 Mar. 2013 with attorney docket no. 1112-004-002-000000,--

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*